United States Patent
Kato et al.

(10) Patent No.: US 8,223,789 B2
(45) Date of Patent: Jul. 17, 2012

(54) MOBILE COMMUNICATION SYSTEM, BASE STATION APPARATUS AND MOBILE STATION APPARATUS

(75) Inventors: Yasuyuki Kato, Osaka (JP); Shohei Yamada, Osaka (JP); Wahoh Oh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/551,304

(22) Filed: Aug. 31, 2009

(65) Prior Publication Data
US 2009/0316631 A1 Dec. 24, 2009

Related U.S. Application Data

(62) Division of application No. 12/447,788, filed as application No. PCT/JP2007/068964 on Sep. 28, 2007.

(30) Foreign Application Priority Data

Oct. 31, 2006 (JP) ................................. 2006-296777

(51) Int. Cl.
*H04H 20/71* (2008.01)
*H04W 4/00* (2009.01)
*H04B 7/216* (2006.01)
*H04B 1/00* (2006.01)
*H04J 3/26* (2006.01)

(52) U.S. Cl. ........ 370/432; 370/312; 370/329; 370/335; 455/422.1; 375/145; 375/149

(58) Field of Classification Search .................. 370/312, 370/328–329, 335, 338, 342, 432, 437, 441, 370/445; 455/422.1; 375/133–137, 145, 375/149

See application file for complete search history.

(56) References Cited

U.S. PATENT DOCUMENTS

| 6,400,695 B1 | 6/2002 | Chuah et al. |
| 6,535,547 B1 | 3/2003 | Lyckegard et al. |
| 6,574,212 B1 * | 6/2003 | Jurgensen et al. ............ 370/348 |
| 6,643,318 B1 * | 11/2003 | Parsa et al. .................... 375/141 |

(Continued)

FOREIGN PATENT DOCUMENTS

JP 2005-210640 A 8/2005

(Continued)

OTHER PUBLICATIONS

TSG-RAN Working Group Meeting #55 R2-062757; "Classification of Signature for non-synchronized access"; Oct. 2006.*

(Continued)

*Primary Examiner* — Andrew Lai
*Assistant Examiner* — Redentor Pasia
(74) *Attorney, Agent, or Firm* — Birch, Stewart, Kolasch & Birch, LLP

(57) ABSTRACT

To prevent a collision from occurring at the time of random access in cases such as handover, response to paging and the like where a mobile station apparatus performs random access in response to directions from a base station apparatus. In a mobile communication system in which a mobile station apparatus 200 uses a signature of a beforehand determined signature group at the time of random access with a base station apparatus 100, the signature group is comprised of a signature group managed by the base station apparatus 100 and another signature group managed by the mobile station apparatus 200. The signature group managed by the base station apparatus 100 includes signatures associated with particular random access reasons to be selected by the base station apparatus 100.

40 Claims, 19 Drawing Sheets

U.S. PATENT DOCUMENTS

| | | | |
|---|---|---|---|
| 6,850,514 | B1* | 2/2005 | Dick et al. .................. 370/352 |
| 7,139,593 | B2 | 11/2006 | Kavak et al. |
| 7,212,809 | B2 | 5/2007 | Khawand |
| 7,809,373 | B2* | 10/2010 | Park et al. .................. 455/436 |
| 2001/0012301 | A1* | 8/2001 | Yi et al. .................. 370/439 |
| 2001/0024956 | A1* | 9/2001 | You et al. .................. 455/455 |
| 2002/0114294 | A1* | 8/2002 | Toskala et al. ............. 370/329 |
| 2003/0114193 | A1 | 6/2003 | Kavak et al. |
| 2005/0232158 | A1* | 10/2005 | Hondo .................. 370/241 |
| 2005/0271025 | A1* | 12/2005 | Guethaus et al. .......... 370/342 |
| 2007/0047493 | A1 | 3/2007 | Park et al. |
| 2008/0316961 | A1 | 12/2008 | Bertrand et al. |
| 2009/0011769 | A1 | 1/2009 | Park et al. |
| 2009/0252125 | A1 | 10/2009 | Vujcic |
| 2009/0323607 | A1 | 12/2009 | Park et al. |
| 2010/0067495 | A1 | 3/2010 | Lee et al. |
| 2010/0330998 | A1 | 12/2010 | Park et al. |

FOREIGN PATENT DOCUMENTS

| | | |
|---|---|---|
| JP | 2007-227996 | 9/2007 |
| KR | 20030051323(A) | 6/2003 |
| RU | 2204220 C2 | 5/2003 |
| RU | 2214686 C2 | 10/2003 |
| RU | 2232469 C2 | 7/2004 |
| WO | WO 00/76248 A1 | 12/2000 |
| WO | WO-01/11823 A2 | 2/2001 |
| WO | WO 2004/064272 A1 | 7/2004 |
| WO | WO-2008/041582 A1 | 4/2008 |

OTHER PUBLICATIONS

3GPP TSG RAN WG2 # 54, R2-062107, Texas Instruments Inc, Content of initial Unsynchronized RACH access and contention resolution, Aug. 28-Sep. 1, 2006, pp. 1-6. Tallinn, Estonia.

3GPP TSG-RAN Working Group 2 # 49, R2-052769, LG Electronics, Initial access for LTE, Nov. 7-11, 2005, pp. 1-2, Seoul, Korea.

3GPP TSG RAN WG1 #42 on LTE, R1-050850, Physical Channels and Multiplexing in Evolved UTRA Uplink, Aug. 29-Sep. 2, 2005, pp. 1-14, London, UK.

3GPP TR 25.814, V7.0.0, Jun. 2006, Technical Report, Physical layer aspects for evolved Universal Terrestrial Radio Access (UTRA), Release 7, pp. 78-85.

TSG-RAN Working Group 2 Meeting #55, R2-062757, Classification of signature for non-synchronized random access, Oct. 9-13, 2006, Seoul, Korea.

TSG-RAN Working Group 2 meeting #55, R2-062809, non-contention based handover procedure on RACH channel, Oct. 9-13, 2006, Seoul, Korea.

TSG-RAN WG1 #44, R1-060584, E-UTRA Random Access, Feb. 13-17, 2006, Denver, CO, USA.

U.S. Office Action dated Nov. 3, 2011 in copending U.S. Appl. No. 12/447,788.

U.S. Advisory Action dated Aug. 3, 2011 in copending U.S. Appl. No. 12/551,298.

U.S. Office Action dated Mar. 17, 2011 in copending U.S. Appl. No. 12/551,298.

U.S. Office Action dated Sep. 17, 2010 in copending U.S. Appl. No. 12/551,298.

Ericsson, "E-UTRA Random Access Preamble Design", 3GPP TSG-RAN WG1 #44bis R1-060998, Athens, Greece, Mar. 27-31, 2006.

European Search Report dated Apr. 3, 2012 for Application No. 09011171.7.

European Search Report dated Mar. 30, 2012 for Application No. 07828705.9.

LG Electronics Inc. "Issue on message 2 transmission", 3GPP TSG RAN WG2 #57 Tdoc R2-070525, St. Louis, USA Feb. 12-16, 2006.

Nokia, "Procedure for non-synchronized random access". 3GPP TSG-RAN WG1 #46bis R1-062822, Seoul, Korea, Oct. 9-13, 2006.

European Search Report, dated Apr. 2, 2012, 2 pages.

\* cited by examiner

| THE NUMBER OF CONNECTED MOBILE STATIONS | SIGNATURE GROUP MANAGEMENT NUMBER | THE NUMBER OF BASE-STATION MANAGED SIGNATURES | THE NUMBER OF MOBILE-STATION MANAGED SIGNATURES |
|---|---|---|---|
| A OR LESS | 1 | 16 | 48 |
| A–B | 2 | 24 | 40 |
| B–C | 3 | 32 | 32 |
| C–D | 4 | 40 | 24 |
| D OR MORE | 5 | 48 | 16 |

FIG. 10

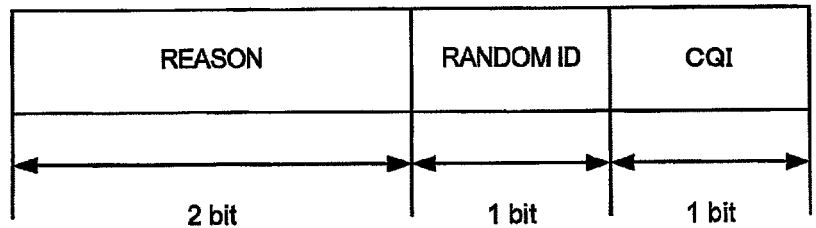
00 : HANDOVER
01 : INITIAL ACCESS
10 : SCHEDULING REQUEST
11 : SYNCHRONIZATION MAINTENANCE
FIG. 16  -- Conventional Art --
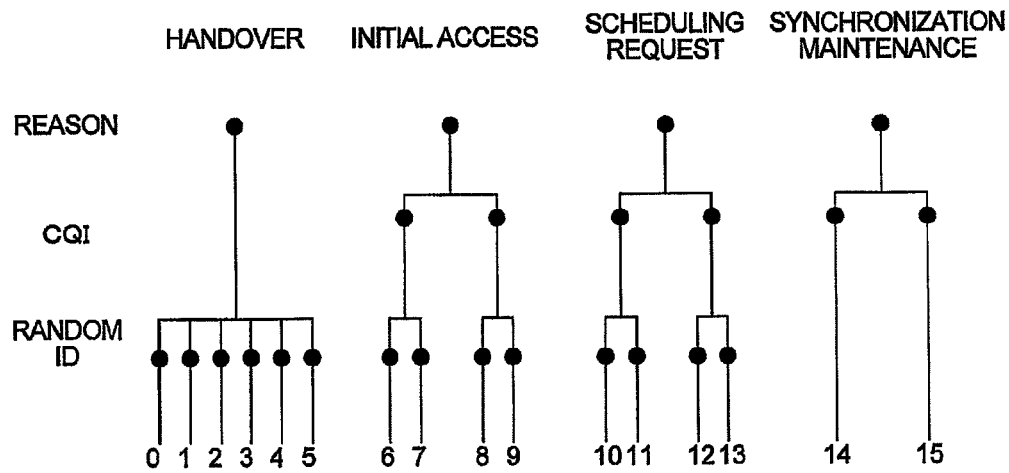
FIG. 17  -- Conventional Art --

MOBILE COMMUNICATION SYSTEM, BASE STATION APPARATUS AND MOBILE STATION APPARATUS

This application is a Divisional of co-pending application Ser. No. 12/447,788 filed on Apr. 29, 2009, which is a National Phase of PCT/JP2007/068964 filed on Sep. 28, 2007, and for which priority is claimed under 35 U.S.C. §120; and these applications claim priority of Application No. JP2006-296777 filed in Japan on Oct. 31, 2006 under 35 U.S.C. §119; the entire contents of all are hereby incorporated by reference.

TECHNICAL FIELD

The present invention relates to a mobile communication system, base station apparatus and mobile station apparatus using a cellular wireless scheme.

BACKGROUND ART

Currently, in 3GPP (3rd Generation Partnership Project), the W-CDMA system has been standardized as a 3rd cellular mobile communication system, and its service has been started sequentially. Further, HSDPA (High Speed Downlink Packet Access) with the communication speed further increased has also been standardized, and its service is being started.

Meanwhile, in 3GPP, evolution in 3rd Generation Radio Access (Evolved Universal Terrestrial Radio Access: hereinafter, referred to as "EUTRA") has been studied. As downlink in the EUTRA, an OFDM (Orthogonal Frequency Division Multiplexing) system is proposed. Further, proposed as uplink in the EUTRA is a DFT (Discrete Fourier Transform)—spread OFDM type single carrier communication system.

As shown in FIG. 14, the uplink of EUTRA is formed of an uplink pilot channel UPiCH, random access channel RACH, and uplink scheduling channel USCH (for example, see Non-Patent Document 1).

The uplink random access channel RACH of E-UTRA contains a non-synchronized random access channel and synchronized random access channel. Herein, a band of 1.25 MHz is used as a maximum unit of the non-synchronized random access channel. Then, for example, as shown in FIG. 15, a plurality of channels for access is prepared, and configured to be able to respond to a number of accesses.

Among intended purposes of the non-synchronized random access channel, it is the biggest purpose to synchronize a mobile station apparatus (hereinafter, referred as a "mobile station") and base station apparatus (hereafter, referred to as a "base station"). Further, it is considered that several-bit information is transmitted to request scheduling for allocating radio resource, and the like to decrease the connection time between the mobile station and base station. Meanwhile, the intended purpose of the synchronized random access channel is to make a scheduling request (Non-patent Document 2).

On the non-synchronized random access channel, only a preamble is transmitted to acquire synchronization. This preamble contains a signature that is a signal pattern indicative of information, and by preparing a few tens of kinds of signatures, it is possible to designate several-bit information. Currently, it is anticipated that information of 4~6 bits is transmitted, and that 16~64 kinds of signatures are prepared. For example, expected as the information of 4~6 bits are a reason of random access, downlink path-loss/CQI (Channel Quality Indicator), random ID and the like. Particularly, in the reason of random access, it is studied to designate handover, initial access, maintenance of synchronization, scheduling request or the like to make the access procedure efficient.

Herein, a configuration example of signatures included in the preamble is described with reference to FIGS. 16 and 17. FIG. 16 shows a configuration example of signatures in the case of splitting each kind of information to a field to designate the information. Shown herein is the case of allocating 2 bits to the reason of random access, 1 bit to random ID, and 1 bit to CQI. In the reason of random access, for example, "00" is selected in designating handover, while "11" is selected in designating maintenance of synchronization. Meanwhile, FIG. 17 shows the case of flexibly selecting the reason of random access, CQI and random ID to designate the information. The case is shown that codes from 0 to 15 are assigned to combinations of the reason of random access, CQI and random ID.

FIG. 18 is a sequence chart to explain an example of a conventional procedure of random access. FIG. 18 shows the procedure of random access in the case of using a non-synchronized random access channel. As shown in FIG. 18, in the conventional procedure of random access, a mobile station first selects a signature based on the reason of random access, downlink path-loss/CQI information, random ID and the like (step (hereinafter, abbreviated as "ST") 1801). Then, the mobile station transmits a preamble (random access preamble) containing the selected signature on the non-synchronized random access channel (ST1802).

Upon receiving the preamble from the mobile station, the base station calculates a synchronization timing deviation between the mobile station and base station from the preamble, and performs scheduling for transmitting an L2/L3 (Layer2/Layer3) message (ST1803). Then, the base station assigns C-RNTI (Cell-Radio Network Temporary Identity) to the mobile station requiring C-RNTI from the random access reason, and transmits synchronization timing deviation information (synchronization information), scheduling information, signature ID number and C-RNTI (ST1804).

Upon receiving the information from the base station, the mobile station extracts a response from the base station including the transmitted signature ID number (ST1805). Then, the mobile station transmits an L2/L3 message with radio resources subjected to scheduling in the base station (ST1806). Upon receiving the L2/L3 message from the mobile station, the base station sends back a response corresponding to the message (ST1807).

A problem of such random access is that a collision occurs in the case that a plurality of different mobile stations selects the same signature and random access channel. When a plurality of mobile stations selects the same signature and transmits the signature with a radio resource block having the same time and frequency i.e. on the same random access channel, a collision occurs in the preamble (ST1802) as shown in FIG. 18.

When the base station cannot detect the preamble (ST1802) due to such a collision, the base station cannot send back the response (ST1804) including the synchronization information and the like. In this case, the mobile station cannot receive the response (ST1804) from the base station, and therefore, needs to select a signature and random access channel again after a lapse of predetermined time to perform random access.

Meanwhile, when the base station can detect the preamble (ST1802), the base station calculates L2/L3 message scheduling and synchronization timing deviation, and sends back a response (ST1804) to the mobile station. However, a plurality of mobile stations receives the response (ST1804) from the base station. Therefore, the plurality of mobile stations transmits the L2/L3 message (ST1806) with radio resources subjected to scheduling, and as a result, the collision occurs in the L2/L3 message (ST1806).

When the base station cannot detect the L2/L3 message (ST1806) due to such a collision, the base station cannot send back the response (ST1807). In this case, the mobile station cannot receive the response (ST1807) from the base station, and therefore, needs to select a signature and random access channel again after a lapse of predetermined time to perform random access. Thus, when a plurality of mobile stations selects the same signature and random access channel, the collision can occur, while when the collision occurs, the time up to ST1807 as shown in FIG. 18 is required at the maximum until the collision is detected.

Meanwhile, when a mobile station capable of executing random access is located in a position as shown in FIG. 19, handover is executed. Also when handover is executed, the above-mentioned random access is performed.

Described herein is an example of a procedure of random access at the time of executing handover. FIG. 20 is a sequence chart to explain an example of a procedure of random access at the time of executing handover. In addition, as in FIG. 18, FIG. 20 shows the procedure of random access in the case of using a non-synchronized random access channel.

As shown in FIG. 20, in the procedure of random access at the time of executing handover, as a preparatory stage, a mobile station first measures radio conditions of adjacent base stations (ST2001). Then, the mobile station transmits the measurement result (measurement report) to base station A that is a base station (hereinafter, "local-base station" as appropriate) currently holding the mobile station (ST2002). Upon receiving the measurement result from the mobile station, the base station A selects an optimal base station from the measurement result (ST2003). In addition, herein, base station B is assumed to be selected as an optimal base station. Then, the base station A transmits a handover request command to the base station B that is a handover destination (ST2004).

Upon receiving the handover request command from the base station A, the base station B assigns C-RNTI to the mobile station performing handover (ST2005) Then, as a response to the handover request, the base station B notifies the base station A of a handover request acknowledge command including the C-RNTI (ST2006). Upon receiving the handover request acknowledge command from the base station B, the base station A transmits a handover command including the C-RNTI to the mobile station (ST2007).

Upon receiving the handover command from the base station A, the mobile station acquires synchronization on downlink of the base station B, and confirms a position of the random access channel from the broadcast channel (ST2008). When the downlink synchronization is acquired, the mobile station selects one signature from among signatures such that the reason of random access is handover (ST2009). Then, the mobile station transmits a preamble (random access preamble) containing the selected signature to the base station B on the random access channel (ST2010).

Upon detecting the signature from the preamble received from the mobile station, the base station B calculates a synchronization timing deviation, and performs scheduling of uplink for the mobile station to transmit a handover completion message (ST2011). Then, the base station B transmits synchronization timing deviation information (synchronization information), scheduling information and signature ID number (ST2012). In addition, in the case that the random access reason is handover, C-RNTI is beforehand notified, and therefore, is not transmitted.

Upon receiving the information to the mobile station from the base station B, the mobile station corrects the synchronization timing deviation based on the synchronization timing deviation information (synchronization information) (ST2013). Then, the mobile station transmits a handover completion message with radio resources subjected to scheduling (ST2014). Upon receiving the handover completion message from the mobile station, the base station sends back a response corresponding to the message (ST2015).

Non-patent Document 1:R1-050850 "Physical Channel and Multiplexing in Evolved UTRA Uplink", 3GPP TSG RAN WG1 Meeting #42 London, UK, Aug. 29-Sep. 2, 2005

Non-patent Document 2: 3GPP TR (Technical Report) 25.814, V7.0.0 (2006-06), Physical layer aspects for evolved Universal Terrestrial Radio Access (UTRA)

DISCLOSURE OF INVENTION

Problems to be Solved by the Invention

In random access such that the reason is handover, since communications are disconnected when a collision with another mobile station occurs, it is desired that a collision does not occur. However, in the mobile communication system such that the mobile station randomly selects a signature and random access channel, the fact is that it is not possible to completely eliminate the collision probability. In addition, when an uplink scheduling channel is used in order for the collision not to occur, since uplink synchronization is not achieved between the mobile station and base station, the base station cannot receive data from the mobile station.

Further, there is a case that a base station other than the base station as a handover destination responds to random access from the mobile station (herein, for example, in the case that the base station-A and base station-C as shown in FIG. 19 respond), and a problem arises that excess downlink radio resources are allocated.

Furthermore, it is expected that when a mobile station receives a paging message notified from the base station to page the mobile station, the mobile station performs random access as a response to paging. At the time of executing such random access as a response to paging, when a collision occurs, another problem occurs that communication efficiency degrades, as well as the connection time being long.

The present invention was carried out in view of such problems, and it is an object to provide a mobile communication system, base station apparatus and mobile station apparatus capable of preventing a collision from occurring at the time of random access in cases such as handover, response to paging and the like where the mobile station apparatus performs random access in response to directions from the base station apparatus.

Means for Solving the Problem (1) To attain the above-mentioned object, the present invention took measures as described below. In other words, a mobile communication system according to the invention is a mobile communication system in which a mobile station apparatus uses a signature of a beforehand determined signature group at the time of random access with a base station apparatus, and is characterized in that the signature group is comprised of a signature group managed by the base station apparatus and another signature group managed by the mobile station apparatus.

Thus, since the signature group used by the mobile station apparatus at the time of random access is provided with the signature group managed by the base station apparatus, random access can be carried out under the initiative of the base station apparatus, and it is thereby possible to prevent a collision from occurring at the time of random access in cases such as handover, response to paging and the like where the mobile station apparatus performs random access in response to directions from the base station apparatus.

(2) The mobile communication system according to the invention is characterized in that the signature group managed by the base station apparatus includes signatures associated with particular random access reasons to be selected by the base station apparatus.

Thus, signatures associated with particular random access reasons are selected by the base station apparatus, it is thereby possible to assign different signatures for each mobile station apparatus, and it is possible to prevent the occurrence of collision caused by mobile stations selecting the same signature at the time of random access.

(3) The mobile communication system of the invention is characterized in that the signature group managed by the base station apparatus includes signatures that are preferentially selected by an adjacent base station apparatus.

Thus, since the signature group managed by the base station apparatus includes signatures that are preferentially selected by an adjacent base station, signatures to select can be adjusted with the adjacent base station apparatus, and it is thereby possible to reduce collisions that could occur with the adjacent base station at the time of random access.

(4) The mobile communication system of the invention is characterized in that the base station apparatus shares information of respectively selected signatures with the adjacent base station.

Thus, since the information of respectively selected signatures is shared with the adjacent base station, signatures to select can be adjusted with the adjacent base station, and it is thereby possible to reduce collisions that could occur with the adjacent base station at the time of random access.

(5) For example, the mobile communication system of the invention is characterized in that the signature group managed by the base station apparatus includes signatures associated with handover as the particular random access reason.

Thus, since the signature group managed by the base station apparatus includes signatures associated with handover as the particular random access reason, it is possible to prevent communications from being disconnected due to the collision in random access performed at the time of handover.

(6) Particularly, the mobile communication system of the invention is characterized in that a signature selected by the base station apparatus is included in a handover message for starting execution of handover and transmitted to the mobile station apparatus.

Thus, a signature selected by the base station apparatus is included in a handover message and transmitted to the mobile station apparatus, and it is thereby possible to transmit a signature selected by the base station apparatus to the mobile station apparatus exploiting an already-existing signal.

(7) Further, the mobile communication system of the invention is characterized in that the signature group managed by the base station apparatus includes signatures associated with a response at the time of receiving paging as the particular random access reason.

Thus, since the signature group managed by the base station apparatus includes signatures associated with a response at the time of receiving paging as the particular random access reason, it is possible to prevent the connection time from being long due to the collision in random access at the time of responding to paging.

(8) Further, the mobile communication system of the invention is characterized in that a signature selected by the base station is included in a paging message for paging the mobile station apparatus and transmitted to the mobile station apparatus.

Thus, a signature selected by the base station apparatus is included in a paging message and transmitted to the mobile station apparatus, and it is thereby possible to transmit a signature selected by the base station apparatus to the mobile station apparatus exploiting an already-existing signal.

(9) The mobile communication system of the invention is characterized by varying a ratio between the signature group managed by the base station apparatus and the signature group managed by the mobile station apparatus corresponding to communication conditions of the base station apparatus and the mobile station apparatus communicating with the base station apparatus.

Thus, since the ratio is varied between the signature group managed by the base station apparatus and the signature group managed by the mobile station apparatus corresponding to current communication conditions, it is possible to determine an optimal ratio between both signature groups corresponding to current communication conditions, and it is possible to efficiently prevent a collision from occurring at the time of random access.

(10) Further, the mobile communication system of the invention is characterized by including details on the signature group managed by the base station apparatus and the signature group managed by the mobile station apparatus in broadcast information to transmit to the mobile station apparatus.

Thus, details on the signature group managed by the base station apparatus and the signature group managed by the mobile station apparatus are included in the broadcast information and transmitted to the mobile station apparatus, and it is thereby possible to transmit details on the signature groups managed by the base station apparatus and the mobile station apparatus to the mobile station apparatus exploiting an already-existing signal.

(11) Furthermore, the mobile communication system of the invention is characterized in that the base station apparatus further selects a frequency band position and/or time position of random access, while selecting the signature.

Thus, as well as the signature, the base station apparatus selects a frequency band position and/or time position of random access, and it is thereby possible to decrease the probability of collision at the time of random access, by selecting the frequency band position and/or time position of the random access channel.

(12) A base station apparatus of the invention is a base station apparatus connecting to a mobile station apparatus using a signature of a beforehand determined signature group at the time of random access, and is characterized by having a signature selecting section that selects a signature associated with a particular random access reason from the signature group, and a signature managing section that manages the signature selected by the signature selecting section.

Thus, since the signature selecting section selects a signature associated with a particular random access reason from the signature group used at the time of random access, it is possible to assign different signatures for each mobile station apparatus, and it is possible to prevent the occurrence of collision caused by mobile stations selecting the same signature at the time of random access.

(13) The base station apparatus of the invention is characterized in that the signature associated with a particular random access reason includes a signature to be preferentially selected by an adjacent base station apparatus, and that the signature selecting section preferentially selects a signature except the signature to be preferentially selected by the adjacent base station apparatus.

Thus, since the signature selecting section preferentially selects a signature except the signature to be preferentially selected by the adjacent base station apparatus, signatures to select can be adjusted with the adjacent base station apparatus, and it is thereby possible to reduce collisions that could occur with the adjacent base station at the time of random access.

(14) Further, the base station apparatus of the invention is characterized in that the signature associated with a particular random access reason includes a signature to be preferentially selected by an adjacent base station apparatus, and that the signature managing section shares information of respectively selected signatures with the adjacent base station apparatus.

Thus, since the signature managing section shares the information of respectively selected signatures with the adjacent base station apparatus, signatures to select can be adjusted with the adjacent base station, and it is thereby possible to reduce collisions that could occur with the adjacent base station at the time of random access.

(15) For example, the base station apparatus of the invention is characterized in that the signature selecting section selects a signature associated with handover as the particular random access reason.

Thus, since the signature selecting section selects a signature associated with handover, it is possible to prevent communications from being disconnected due to the collision in random access performed at the time of handover.

(16) Particularly, the base station apparatus of the invention is characterized in that a signature selected by the signature selecting section is included in a handover message for starting execution of handover and transmitted to the mobile station apparatus.

Thus, the selected signature is included in a handover message and transmitted to the mobile station apparatus, and it is thereby possible to transmit a signature selected by the base station apparatus to the mobile station apparatus exploiting an already-existing signal.

(17) Further, the base station apparatus of the invention is characterized in that the signature selecting section selects a signature associated with a response at the time of receiving paging as the particular random access reason.

Thus, since the signature selecting section selects a signature associated with a response in receiving paging, it is possible to prevent the connection time from being long due to the collision in random access at the time of responding to paging.

(18) Particularly, the base station apparatus of the invention is characterized in that a signature selected by the signature selecting section is included in a paging message for paging the mobile station apparatus and transmitted to the mobile station apparatus.

Thus, the selected signature is included in a paging message and transmitted to the mobile station apparatus, and it is thereby possible to transmit a signature selected by the base station apparatus to the mobile station apparatus exploiting an already-existing signal.

(19) The base station apparatus of the invention is characterized by increasing or decreasing signatures capable of being selected by the signature selecting section corresponding to communication conditions with the mobile station apparatus communicating with the base station apparatus.

Thus, since signatures capable of being selected by the signature selecting section are increased or decreased corresponding to communication conditions with the mobile station apparatus communicating with the base station apparatus, it is possible to select the optimal number of signatures corresponding to current communication conditions, and it is possible to efficiently prevent a collision from occurring at the time of random access.

(20) Further, the base station apparatus of the invention is characterized by including in broadcast information a result of increasing or decreasing signatures capable of being selected by the signature selecting section corresponding to communication conditions with the mobile station apparatus communicating with the base station apparatus to transmit to the mobile station apparatus.

Thus, a result of increasing or decreasing signatures capable of being selected by the signature selecting section is included in the broadcast information and transmitted to the mobile station apparatus, and it is thereby possible to transmit the result of increasing or decreasing signatures capable of being selected by the signature selecting section exploiting an already-existing signal.

(21) The base station apparatus of the invention is characterized in that the signature selecting section selects the signature associated with a particular random access reason, and a frequency band position and/or time position of random access, and that the signature managing section manages the signature selected by the signature selecting section, and the frequency band position and/or time position of random access.

Thus, as well as the signature associated with a particular random access reason, the frequency band position and/or time position of random access is selected by the signature selecting section and managed by the signature managing section, and it is thereby possible to decrease the probability of collision at the time of random access, by selecting the frequency band position and/or time position of the random access channel.

(22) A mobile station apparatus of the invention is a mobile station apparatus connecting to a base station apparatus to transmit a signature of a beforehand determined signature group at the time of random access, and is characterized by having a receiving section that receives a signal transmitted from the base station apparatus, a control data extracting section that extracts a signature from the signal, and a transmitting section that transmits a preamble corresponding to the extracted signature to the base station apparatus or another base station apparatus.

Thus, since the mobile station apparatus receives a signal transmitted from the base station apparatus, extracts a signature from the signal, and transmits a preamble corresponding to the extracted signature to the base station apparatus or another base station apparatus, random access can be carried out under the initiative of the base station apparatus. It is thereby possible to prevent a collision from occurring at the time of random access in cases such as handover, response to paging and the like where the mobile station apparatus performs random access in response to directions from the base station apparatus. Further, the base station apparatus refers to the preamble received from the mobile station apparatus, and when the signature is not assigned by the base station apparatus, does not respond to the mobile station apparatus on downlink to leave, and it is thereby possible to eliminate wasteful use of radio resources on downlink.

Advantageous Effect of the Invention

According to the invention, since the signature group used by the mobile station apparatus at the time of random access is provided with the signature group managed by the base station apparatus, random access can be carried out under the initiative of the base station apparatus, and it is thereby possible to prevent a collision from occurring at the time of random access in cases such as handover, response to paging and the like where the mobile station apparatus performs random access in response to directions from the base station apparatus.

BRIEF DESCRIPTION OF DRAWINGS

FIG. 10 is a diagram showing a table for determining the numbers of base-station managed signatures and mobile-station managed signatures in the communication system according to Embodiment 5;

FIG. 16 is a diagram to explain a conventional configuration example of signatures;

FIG. 17 is a diagram to explain another conventional configuration example of signatures;

DESCRIPTION OF SYMBOLS

Figure 1:
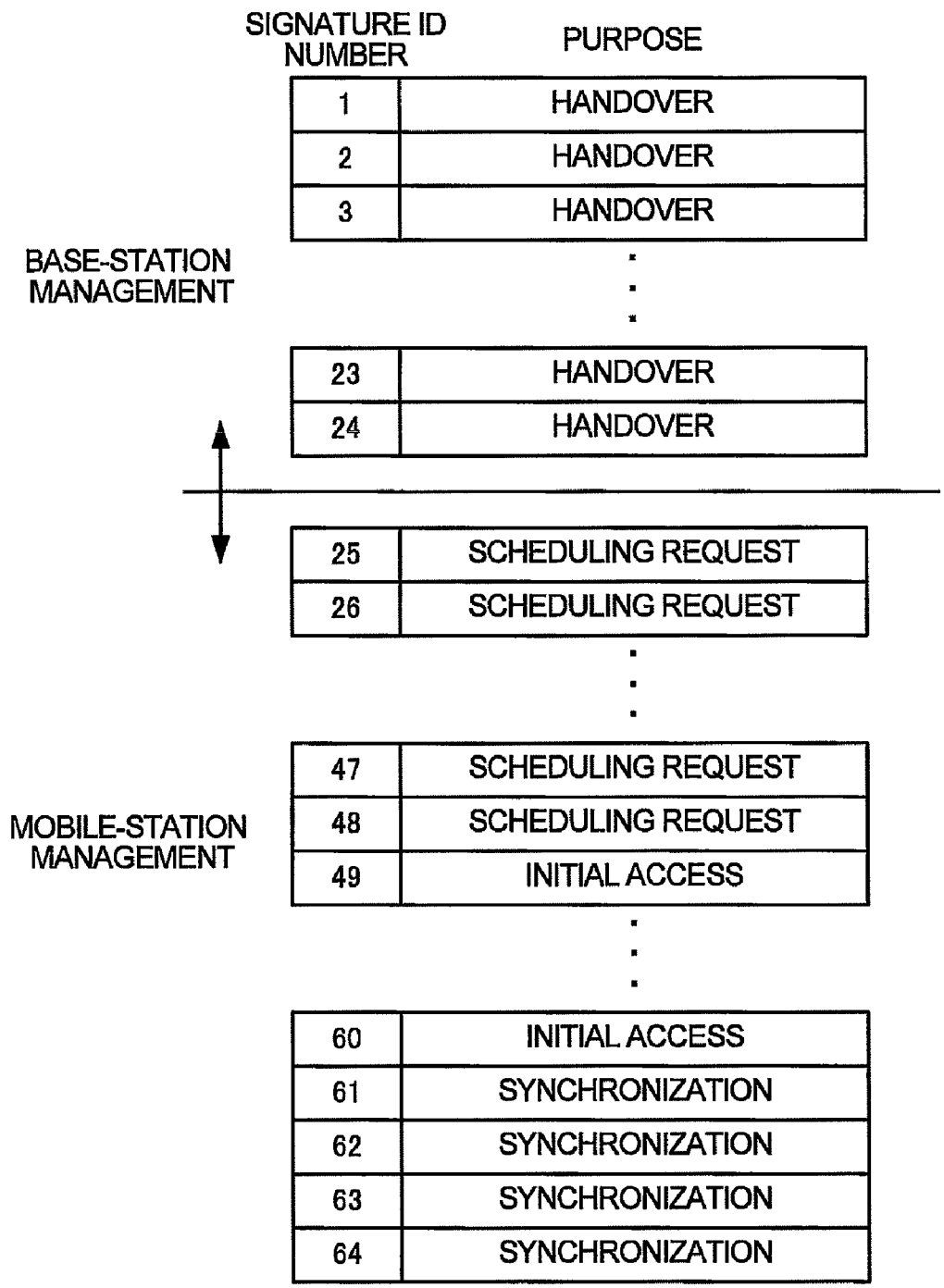
FIG. 1 is a diagram to explain a setting example of signatures in a communication system according to Embodiment 1 of the invention.

100 Base station apparatus (Base station)
101 Data control section
102 OFDM modulation section
103 Scheduling section
104 Radio section
105 Channel estimation section
106 DFT-S-OFDM demodulation section
107 Control data extracting section
108 Preamble detecting section
109 Signature selecting section
110 Signature managing section
200 Mobile station apparatus (Mobile station)
201 Data control section
202 DFT-S-OFDM modulation section
203 Scheduling section
204 Signature selecting section
205 Preamble generating section
206 Synchronization correcting section
207 Radio section
208 Channel estimation section
209 OFDM demodulation section
210 Control data extracting section

BEST MODE FOR CARRYING OUT THE INVENTION

Embodiments of the invention will be described below with reference to accompanying drawings. A mobile communication system (hereinafter, referred to as a "communication system" as appropriate) according to the Embodiments of the invention enables part of management (selection) of signatures that has conventionally been performed in a mobile station apparatus (hereinafter, referred to as a "mobile station") irrespective of an intended purpose of random access to be performed in a base station apparatus (hereinafter, referred to as a "base station") corresponding to a reason of random access.

In other words, in the communication system according to the Embodiments, corresponding to the intended purpose of random access, the mobile station separates signatures (hereinafter, referred to as "base-station managed signatures" as appropriate) managed by the base station apparatus and signatures (hereinafter, referred to as "mobile-station managed signatures" as appropriate) managed by the mobile station to use. In other words, the base-station managed signatures are signatures selectable in the base station, and the mobile-station managed signatures are signatures selectable in the mobile station.

(Embodiment 1)

FIG. 1 is a diagram to explain a setting example of signatures in a communication system according to Embodiment 1 of the invention. In the communication system according to Embodiment 1, as shown in FIG. 1, signature ID numbers (hereinafter, referred to as "signature numbers") 1 to 24 are allocated as base-station managed signatures, and signature numbers 25 to 64 are allocated as mobile-station managed signatures. Particularly, in the communication system according to Embodiment 1, signature numbers 1 to 24 are set for handover as their intended purpose, and signature numbers 25 to 64 are set for scheduling request, initial access, and synchronization maintenance (synchronization) as their intended purpose.

Figure 2:
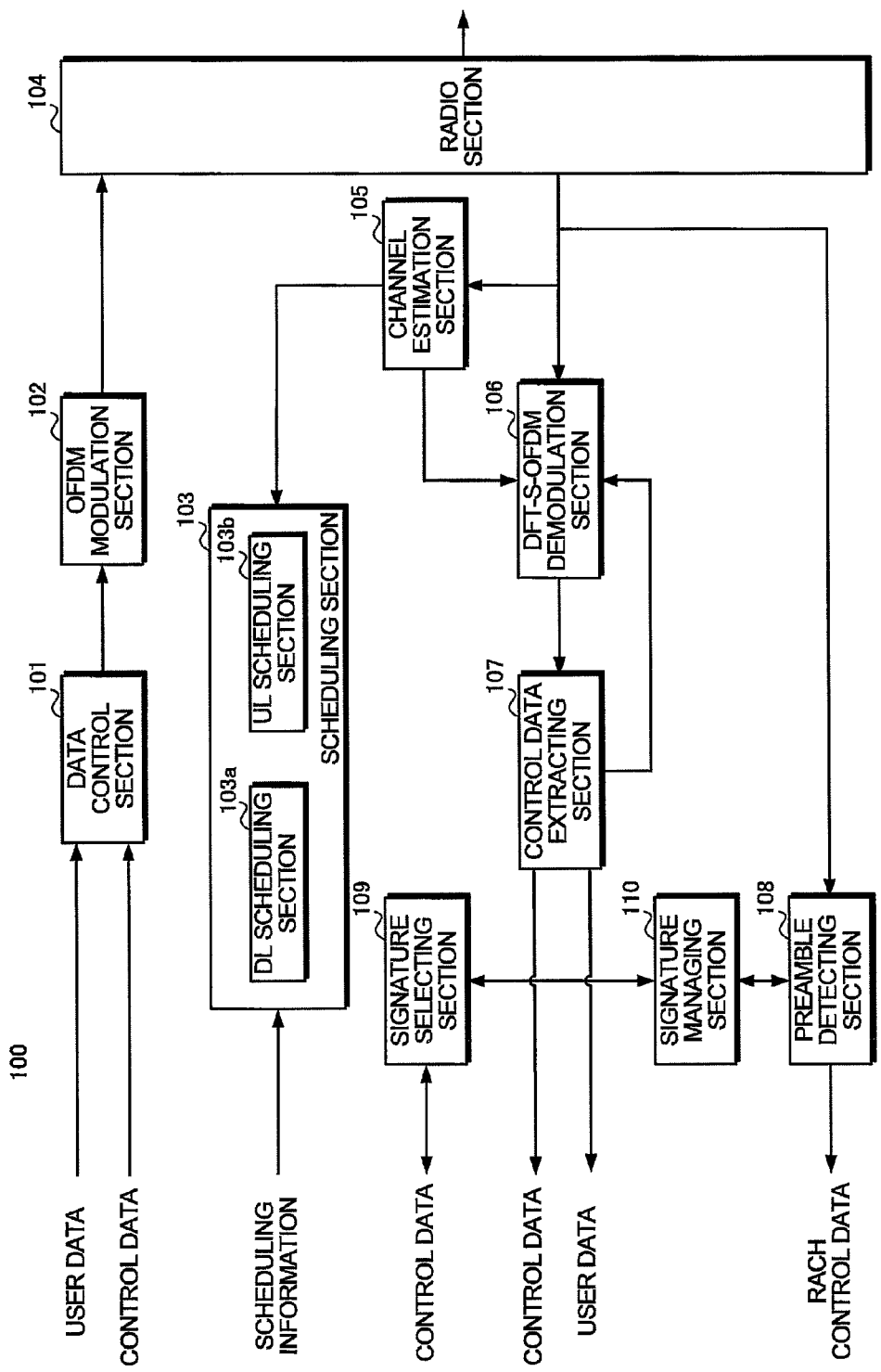
FIG. 2 is a block diagram showing an example of a configuration of a base station included in the communication system according to Embodiment 1.
Figure 3:
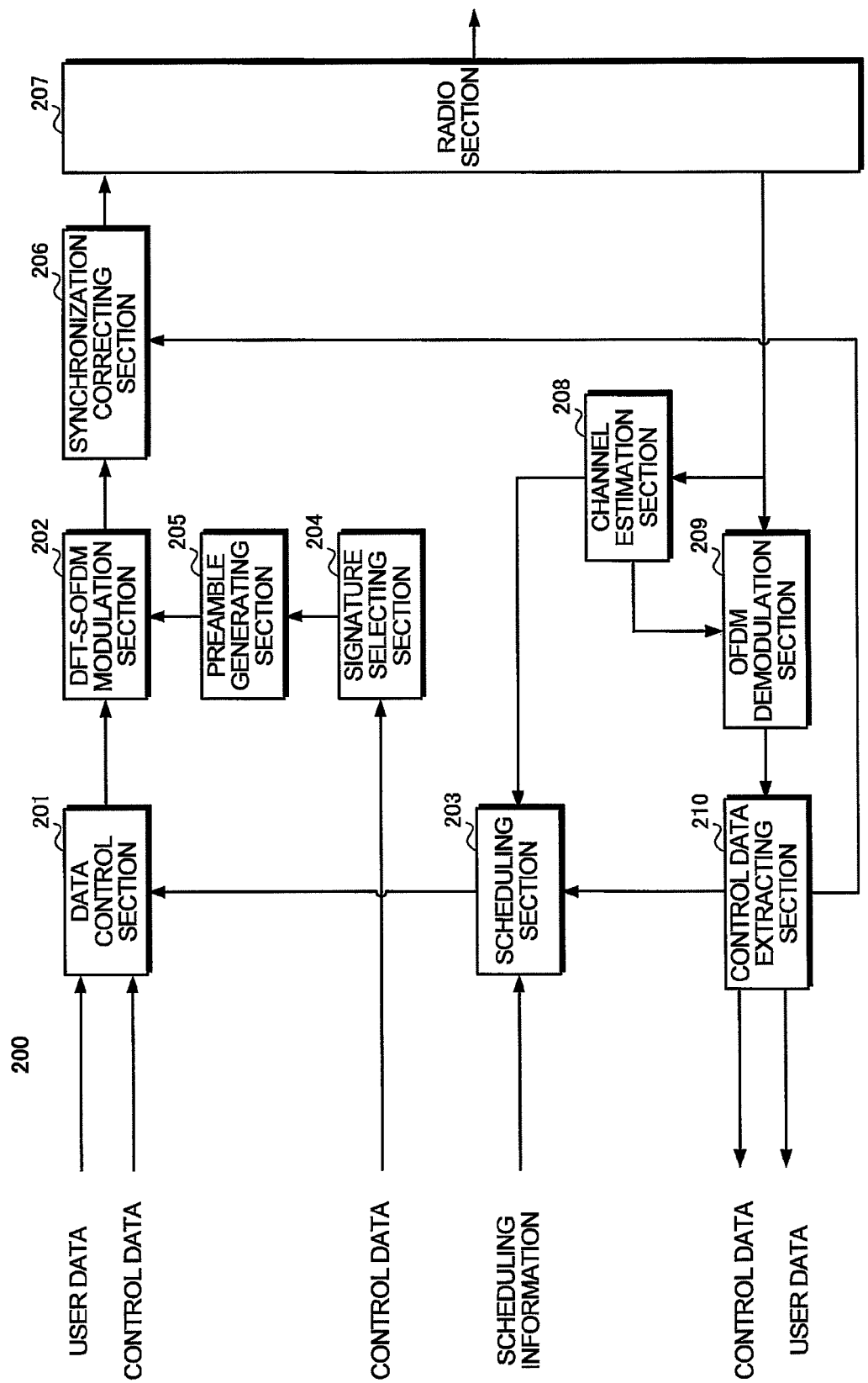
FIG. 3 is a block diagram showing an example of a configuration of a mobile station included in the communication system according to Embodiment 1.

Described herein are configurations of the base station and mobile station included in the communication system according to Embodiment 1 where signatures are thus set. FIG. 2 is a block diagram showing an example of the configuration of the base station included in the communication system according to Embodiment 1. FIG. 3 is a block diagram showing an example of the configuration of the mobile station included in the communication system according to Embodiment 1.

As shown in FIG. 2, the base station 100 is comprised of a data control section 101, OFDM modulation section 102, scheduling section 103, radio section 104, channel estimation section 105, DFT-Spread-OFDM demodulation section (DFT-S-OFDM demodulation section) 106, control data extracting section 107, preamble detecting section 108, signature selecting section 109 and signature managing section 110.

The data control section 101 receives inputs of control data and user data, and corresponding to directions from the scheduling section 103, performs mapping of the control data on a downlink shared control channel, downlink synchronized channel, downlink pilot channel and downlink shared control signaling channel, while further performing mapping of transmission data (user data) to each mobile station on a shared data channel. The OFDM modulation section 102 performs data modulation, serial/parallel transform of an input signal, IFFT (Inverse Fast Fourier Transform), CP (Cyclic Prefix) insertion, filtering and the like, and thus performs OFDM signal processing to generate an OFDM signal.

The scheduling section 103 is comprised of a DL scheduling section 103a that performs downlink scheduling, and UL scheduling 103b that performs uplink scheduling. The DL scheduling section 103a performs scheduling to perform mapping of user data on each downlink channel from CQI information notified from the mobile station, and data information of each user notified from a higher layer. The UL scheduling section 103b performs scheduling to perform mapping of user data on each uplink channel from an uplink radio propagation path estimation result from the channel estimation section 105, and resource allocation request from the mobile station.

The radio section 104 up-converts the OFDM modulated data into a radio-frequency signal to transmit to the mobile station. Further, the radio section 104 receives uplink data from the mobile station, down-converts the data to a baseband signal, and outputs the reception data to the channel estimation section 105, DFT-S-OFDM demodulation section 106 and preamble detecting section 108.

The channel estimation section 105 estimates radio propagation path characteristics from the uplink pilot channel UPiCH, and outputs an estimation result to the DFT-S-OFDM demodulation section 106. Further, to perform uplink scheduling, the section 105 outputs the radio propagation path estimation result to the scheduling section 103. In addition, as an uplink communication system, a single-carrier system is assumed such as DFT-S-OFDM and the like, but a multicarrier system is also allowed such as the OFDM system and the like.

The DFT-S-OFDM demodulation section 106 demodulates the reception data output from the radio section 104, corresponding to the radio propagation path estimation result from the channel estimation result 105. The control data extracting section 107 divides the reception data into user data (uplink shared data channel USDCH) and control data (uplink shared control signaling channel USCSCH). Among the divided control data, the downlink CQI information is output to the scheduling section 103, and the other control data and user data is output to the higher layer.

The preamble detecting section 108 detects a preamble, calculates a synchronization timing deviation amount, and reports the signature number and synchronization timing deviation amount. When the signature number is a base-station managed signature number described later, the section 108 checks whether or not the signature is used by the base station 100 with the signature managing section 110. As a result of the check, when the signature is used by the base station 100, the section 108 reports the signature number and synchronization timing deviation amount to the higher layer. On the other hand, when the signature is not used by the base station 100, the section 108 does not report the signature number and synchronization timing deviation amount to the higher layer.

The signature selecting section 109 selects a signature corresponding to directions from the higher layer to notify the higher layer and signature managing section 110. In selecting a signature, the section 109 checks with the signature managing section 110 for signature numbers being used, and selects one from among signatures except the signature being used.

The signature managing section 110 stores a signature ID number selected in the signature selecting section 109, and deletes the base-station managed signature detected in the preamble detecting section 108 from stored signatures.

Meanwhile, as shown in FIG. 3, the mobile station 200 is comprised of a data control section 201, DFT-S-OFDM modulation section 202, scheduling section 203, signature selecting section 204, preamble generating section 205, synchronization correcting section 206, radio section 207, channel estimation section 208, OFDM demodulation section 209 and control data extracting section 210.

The data control section 201 receives inputs of user data and control data, and corresponding to directions from the scheduling section 203, performs mapping of the data on an uplink scheduling channel. The DFT-S-OFDM modulation section 202 modulates the data, performs DFT-S-OFDM signal processing such as DFT transform, subcarrier mapping, IFFT, CP (Cyclic Prefix) insertion, filtering and the like, and generates a DFT-Spread-OFDM signal. In addition, as an uplink communication system, a single-carrier system is assumed such as DFT-Spread OFDM and the like, but a multicarrier system is also allowed such as the OFDM system.

The scheduling section 203 performs scheduling to perform mapping of user data on each uplink channel from CQI information notified from the channel estimation section 208 described later, and scheduling information notified from the higher layer.

The signature selecting section 204 selects a signature number to use in random access corresponding to directions from the higher layer. As directions from the higher layer, the purpose of random access is notified. When the notified purpose is a base-station managed purpose such as handover, paging or the like, the section 204 selects the signature number instructed from the higher layer. Meanwhile, when the purpose is a mobile-station managed purpose, the section 204 randomly selects one from among mobile-station managed signatures sorted according to the purposes, corresponding to the purpose, and outputs the selected signature number to the preamble generating section 205.

The preamble generating section 205 generates a preamble with the signature number selected in the signature selecting section 204 to output to the DFT-S-OFDM modulation section 202. The synchronization correcting section 206 determines transmission timing from the synchronization information output from the control data extracting section 210 described later, and outputs data modulated to adapt to the transmission timing to the radio section 207. The radio section 207 sets a radio frequency, and up-converts the modulated data into a radio-frequency signal to transmit to the base station 100. Further, the radio section 207 receives downlink data from the base station 100 to down-convert into a baseband signal, and outputs reception data to the OFDM demodulation section 209.

The channel estimation section 208 estimates radio propagation path characteristics from the downlink pilot channel, and outputs the estimation result to the OFDM demodulation section 209. Further, the section 208 converts the result into CQI information to notify the base station 100 of the radio propagation path estimation result, and outputs the CQI information to the scheduling section 203.

The OFDM demodulation section 209 demodulates the reception data output from the radio section 207, corresponding to the radio propagation path estimation result of the channel estimation section 208.

The control data extracting section 210 divides the reception data into user data and control data. The scheduling information in the divided control data is output to the scheduling section 203, uplink synchronization information is output to the synchronization correcting section 206, and the other control data and user data is output to the higher layer.

Figure 4:
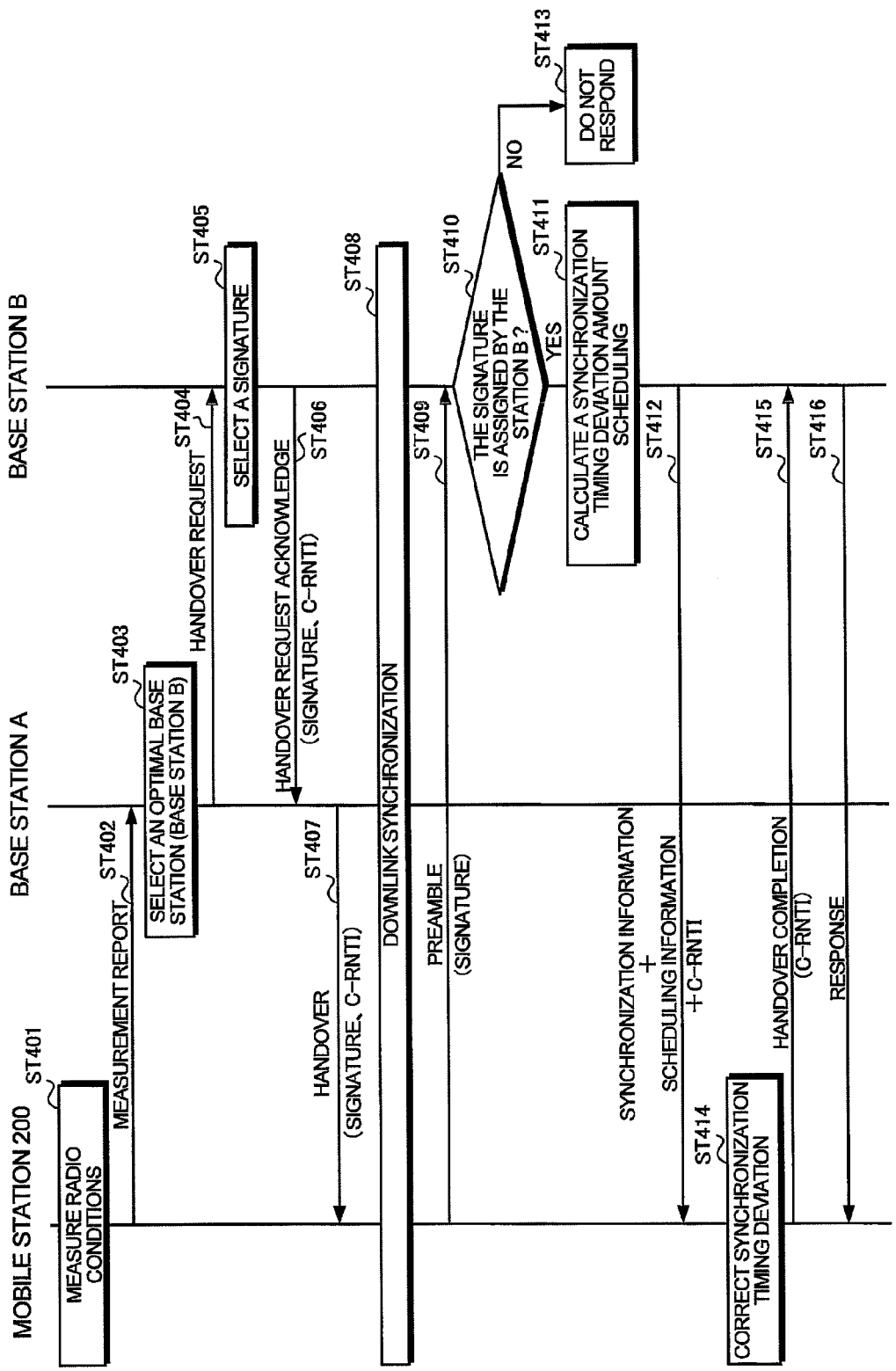
FIG. 4 is a sequence chart to explain an example of a random access procedure at the time of executing handover in the communication system according to Embodiment 1.

Described next is an example of a random access procedure at the time of executing handover in the communication system having the above-mentioned configuration. FIG. 4 is a sequence chart to explain an example of a random access procedure at the time of executing handover in the communication system according to Embodiment 1. In addition, it is assumed herein that the mobile station 200 is currently held by a base station 100A (hereinafter, referred to as a "base station A" as appropriate).

As shown in FIG. 4, in the random access procedure at the time of executing handover in the communication system according to Embodiment 1, as a preparatory stage, the mobile station 200 first measures radio conditions of adjacent base stations (ST401). Then, the mobile station 200 transmits the measurement result (measurement report) to the base station A that is the local-base station (ST402). Upon receiving the measurement result from the mobile station, the base station A selects an optimal base station from the measurement result (ST403). In addition, herein, as the optimal base station, a base station 100B (hereinafter, referred to as a "base station B" as appropriate) is assumed to be selected. Then, the base station A transmits a handover request command to the base station B that is a handover destination (ST404).

Upon receiving the handover request command from the base station A, the base station B selects one signature from among base-station managed signatures (ST405). Herein, a signature of signature number 1 is assumed to be selected. In this case, to avoid a collision of random access, the base station B selects a signature from among the base-station managed signatures except signatures being used in the base station B. Then, after assigning C-RNTI to the mobile station 200 for performing handover, the base station B notifies the base station A of a handover request acknowledge command including the signature number and C-RNTI as a response to the handover request command (ST406).

Upon receiving the handover request acknowledge command from the base station B, the base station A transmits a handover command (handover message) including the signature number and C-RNTI to the mobile station 200 (ST407). Upon receiving the handover command from the base station A, the mobile station 200 acquires downlink synchronization with the base station B, and checks a position of the random access channel from the broadcast channel (ST408). After acquiring downlink synchronization, the mobile station 200 transmits a preamble (random access preamble) including a signature of the signature number added to the handover command i.e. the signature of signature number 1 to the base station B on the random access channel (ST409).

Upon detecting the signature from the preamble received from the mobile station 200, the base station B determines whether the signature is assigned by the base station B (ST410). Herein, since the base station B receives the signature of signature number 1 and this signature of signature number 1 is assigned by the base station B, the base station B calculates a synchronization timing deviation amount and performs scheduling for transmitting a handover completion message (ST411). Then, the base station B transmits the synchronization timing deviation information (synchronization information), scheduling information and C-RNTI (ST412). In this case, since C-RNTI is beforehand notified, the signature number is not required as identification information for checking data to the mobile station 200 by the station 200, and C-RNTI is enough.

In addition, in the determination in ST410, when the base station B determines that the signature received from the mobile station 200 is not the signature assigned by the base station B, the base station B does not respond to the mobile station 100 to leave (ST413).

Upon receiving the information to the mobile station 200 from the base station B, the station 200 corrects the synchronization timing deviation based on the synchronization timing deviation information (synchronization information) (ST414). Then, the mobile station 200 transmits a handover completion message with radio resources subjected to scheduling (ST415). Upon receiving the handover completion message from the mobile station 200, the base station B sends back a response to the mobile station 200 in response to the message (ST416).

Thus, in the communication system according to Embodiment 1, since the signature group used by the mobile station 200 at the time of random access is provided with the signature group (base-station managed signature group) managed by the base station 100, random access can be carried out under the initiative of the base station 100, and it is thereby possible to prevent a collision from occurring at the time of random access in the case that the mobile station 200 performs random access in response to directions from the base station 100.

Further, in the communication system according to Embodiment 1, the base-station managed signatures include signatures which are associated with particular random access reasons such as handover and the like and selected by the base station 100. The base station 100 selects the signatures thus associated with particular random access reasons, and is thereby capable of assigning different signatures for each mobile station 200, and it is possible to prevent the occurrence of collision caused by the mobile stations 200 selecting the same signature at the time of random access.

Particularly, in the communication system according to Embodiment 1, since the base-station managed signatures include signatures associated with handover as the random access reason, it is possible to prevent a collision from occurring in random access performed at the time of handover. As a result, it is possible to prevent communications from being disconnected due to the collision. Further, when the base station A that is the local-base station and adjacent base station (not shown) receive a signature for handover from the mobile station 200, in the case that the signature is not assigned by the station A or station B, the station A or B does not send back a response to the mobile station 200 on downlink, and downlink radio resources are not used uselessly.

In addition, in the communication system according to Embodiment 1, a signature selected by the base station 100 is included in a handover message and transmitted to the mobile station 200, and therefore, it is possible to transmit the signature selected by the base station 100 to the mobile station 200 exploiting an already-existing signal.

(Embodiment 2)

In the mobile communication system according to Embodiment 1, the base station 100 selects a signature, while managing the information of signatures used in the base station 100, thereby preventing the collision in the base station 100 in random access at the time of handover. However, when mobile stations 200 held in the adjacent base station concurrently perform handover and select the same signature, the collision can occur. In a communication system according to Embodiment 2, signature numbers to select are adjusted between adjacent base stations, and it is intended to reduce collisions that could occur in random access at the time of handover.

In addition, configurations of the base station 100 and mobile station 200 constituting the communication system according to Embodiment 2 are the same as those in Embodiment 1, and descriptions thereof are omitted. Further, signatures in the communication system according to Embodiment 2 differ from those in the communication system according to Embodiment 1 in the respect that a range of signatures for each base station to preferentially use is provided in base-station managed signatures.

Figure 5:
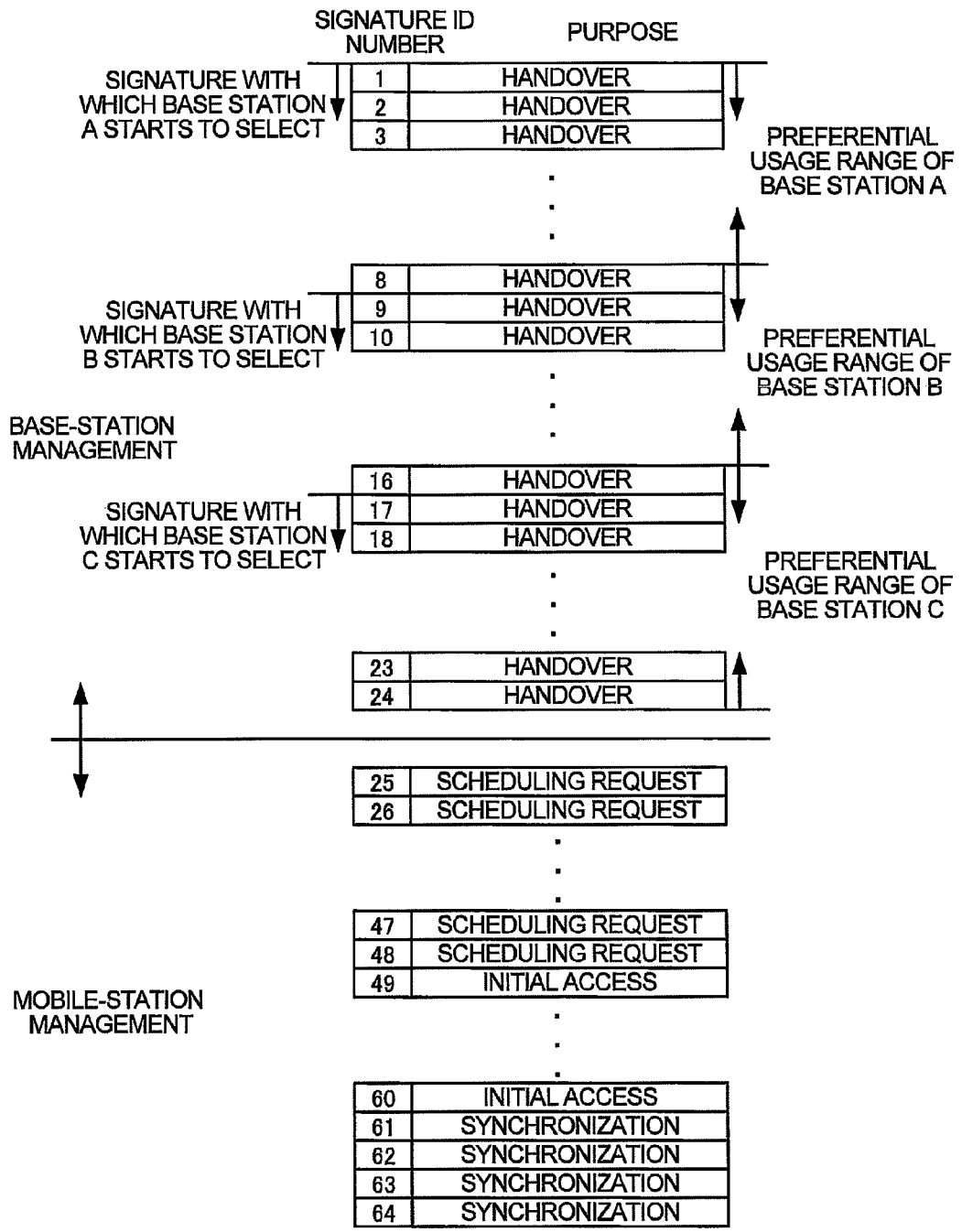
FIG. 5 is a diagram to explain a setting example of signatures in a communication system according to Embodiment 2 of the invention.

FIG. 5 is a diagram to explain a setting example of signatures in the communication system according to Embodiment 2 of the invention. In the communication system according to Embodiment 2, as shown in FIG. 5, signature numbers 1 to 24 allocated as base-station managed signatures are provided with ranges respectively for base stations (herein, base station A to base station C) to preferentially use. More specifically, the range (hereinafter, referred to as a "base-station A preferentially used range" as appropriate) for the base station A to preferentially use is signature numbers 1 to 8, the range (hereinafter, referred to as a "base-station B preferentially used range" as appropriate) for the base station B to preferentially use is signature numbers 9 to 16, and the range (hereinafter, referred to as a "base-station C preferentially used range" as appropriate) for the base station C to preferentially use is signature numbers 17 to 24.

In this case, the base station A allocates signatures to mobile stations performing handover in ascending order of the signature number starting with signature number 1. Similarly, the base station B allocates signatures to mobile stations performing handover in ascending order of the signature number starting with signature number 9, and the base station C allocates signatures to mobile stations performing handover in ascending order of the signature number starting with signature number 17. Then, in each base station, when all the signatures in the range to preferentially use are allocated to mobile stations, the base station selects a signature of the number with a low priority in the range for another station to preferentially use. For example, when the base station A allocates all the signatures of signature numbers 1 to 8 to mobile stations, the base station A selects a signature in ascending order of the signature number, starting with the signature numbered lowest signature number 16 given the lowest priority in the base-station B preferentially used range, or the signature numbered number starting with the lowest signature number 24 given the lowest priority in the base-station C preferentially used range.

Thus, in the communication system according to Embodiment 2, ranges of signature numbers to preferentially use are beforehand determined among adjacent base stations, selection of signatures is thus adjusted, and it is thereby possible to reduce collisions that could occur with the adjacent base station in random access at the time of handover.

(Embodiment 3)

In the communication system according to Embodiment 2, to reduce collisions that could occur with the adjacent base station in random access at the time of handover, ranges of signature numbers to preferentially use are beforehand determined among adjacent base stations, and selection of signatures is adjusted. In contrast thereto, in a communication system according to Embodiment 3, signature information is shared among adjacent base stations, and it is intended to reduce collisions that could occur with the adjacent base station in random access at the time of handover.

In addition, configurations of the base station 100 and mobile station 200 constituting the communication system according to Embodiment 3 are the same as those in Embodiment 1, and descriptions thereof are omitted. Further, with respect to signatures in the communication system according to Embodiment 3, as in the communication system according to Embodiment 1, signature numbers 1 to 24 are allocated as base-station managed signatures, and signature numbers 25 to 64 are allocated as mobile-station managed signatures.

Figure 6:
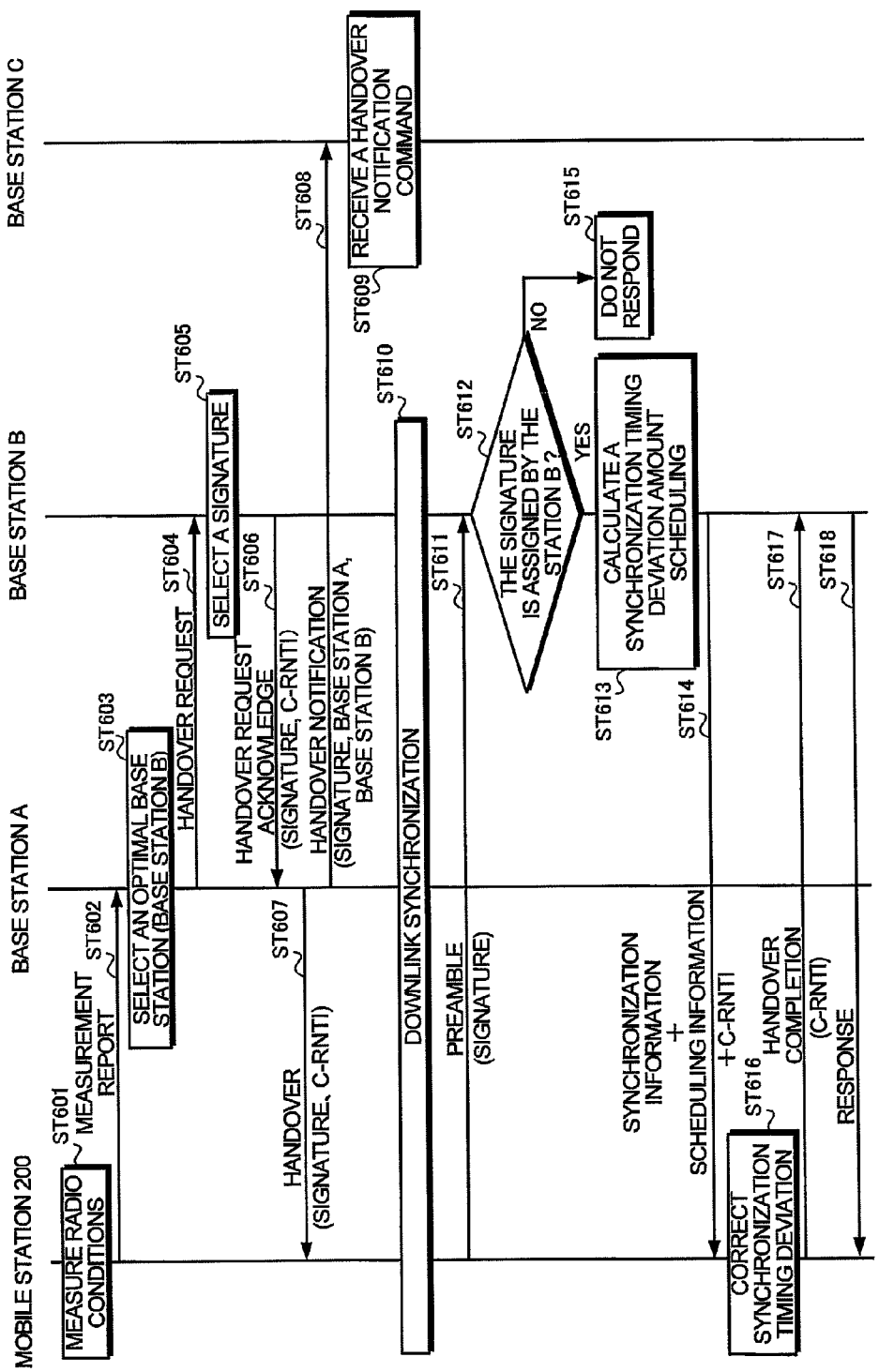
FIG. 6 is a sequence chart to explain an example of a random access procedure at the time of executing handover in a communication system according to Embodiment 3 of the invention.
Figure 19:
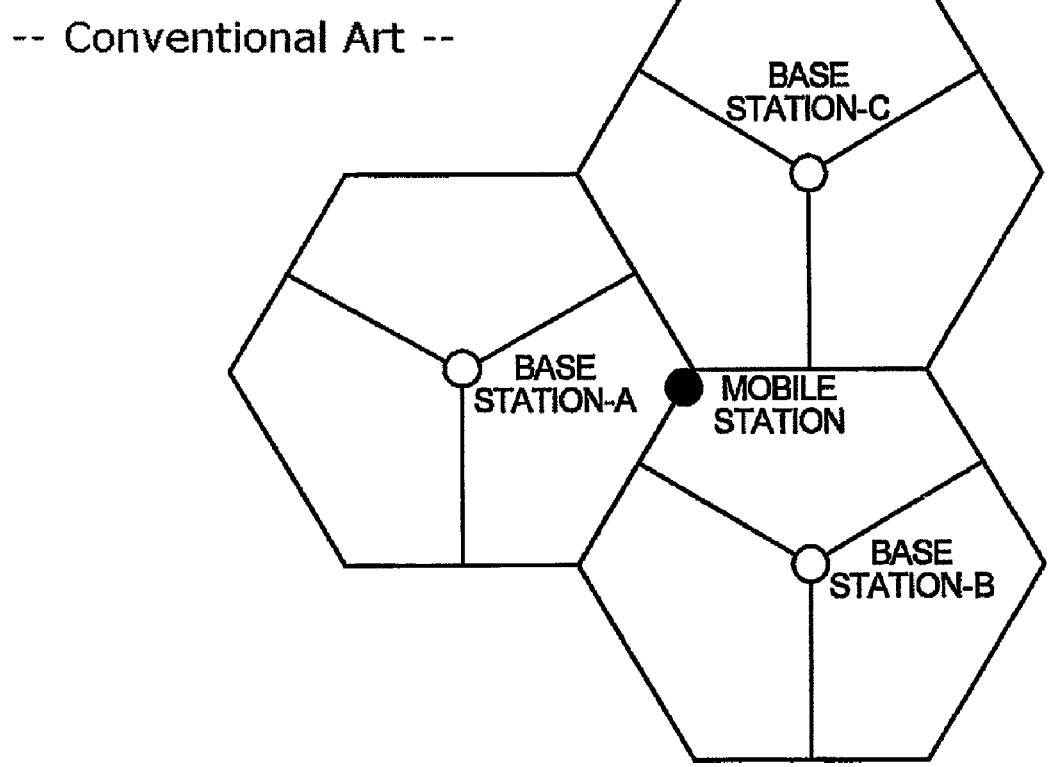
FIG. 19 is a diagram to explain locations of base stations where handover arises.
Figure 20:
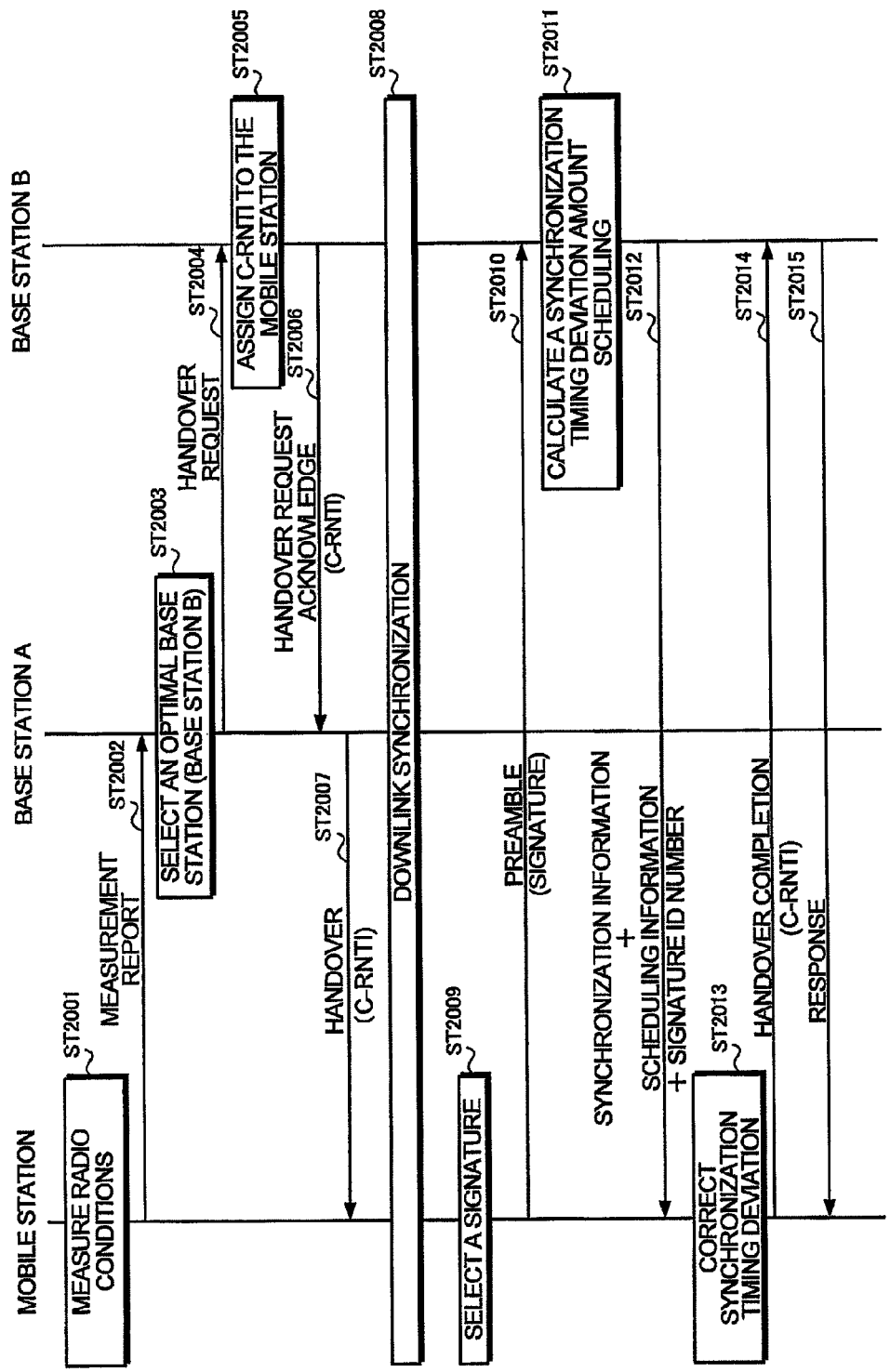
FIG. 20 is a sequence chart to explain another example of a conventional procedure of random access at the time of executing handover.

Described below is an example of a random access procedure at the time of executing handover in the communication system according to Embodiment 3. FIG. 6 is a sequence chart to explain an example of a random access procedure at the time of executing handover in the communication system according to Embodiment 3. In addition, it is assumed herein that the mobile station 200 is currently held by the base station A, and that the base station A is adjacent to the base station B and base station 100c (hereinafter, referred to as a "base station C" as appropriate) (for example, see FIG. 19).

As shown in FIG. 6, in the random access procedure at the time of executing handover in the communication system according to Embodiment 3, as a preparatory stage, the mobile station 200 first measures radio conditions of adjacent base stations (ST601). Then, the mobile station 200 transmits the measurement result (measurement report) to the base station A that is the local-base station (ST602). Upon receiving the measurement result from the mobile station, the base station A selects an optimal base station from the measurement result (ST603). In addition, herein, as the optimal base station, the base station B is assumed to be selected. Then, the base station A transmits a handover request command to the base station B that is a handover destination (ST604).

Upon receiving the handover request command from the base station A, the base station B selects one signature from among base-station managed signatures (ST605). Herein, a signature of signature number 1 is assumed to be selected. In this case, to avoid a collision of random access, the base station B selects a signature from among the base-station managed signatures except signature being used in the base station B and the other base stations. Then, after assigning C-RNTI to the mobile station 200 for performing handover, the base station B notifies the base station A of a handover request acknowledge command including the signature number and C-RNTI as a response to the handover request command (ST606).

Upon receiving the handover request acknowledge command from the base station B, the base station A transmits a handover command including the signature number and C-RNTI to the mobile station 200 (ST607). Further, the base station A transmits a handover notification command for notifying that the signature of signature number 1 is used between the base stations A and B to the base station C (ST608). When the handover notification command arrives from the base station A, the base station C receives the command (ST609), and registers that the signature of signature number 1 is used between the base stations A and B.

Upon receiving the handover command from the base station A, the mobile station 200 acquires downlink synchronization with the base station B, and checks a position of the random access channel from the broadcast channel (ST610). After acquiring downlink synchronization, the mobile station 200 gains access to the base station B on the random access using a preamble (random access preamble) including a signature of the signature number added to the handover command i.e. the signature of signature number 1 (ST611).

Upon detecting the signature from the preamble received from the mobile station 200, the base station B determines whether the signature is assigned by the base station B (ST612). Herein, since the base station B receives the signature of signature number 1 and this signature of signature number 1 is assigned by the base station B, the base station B calculates a synchronization timing deviation amount and performs scheduling for transmitting a handover completion message (ST613). Then, the base station B transmits the synchronization timing deviation information (synchronization information), scheduling information and C-RNTI (ST614). In this case, since C-RNTI is beforehand notified, the signature number is not required as identification information for checking data to the mobile station 200 by the station 200, and C-RNTI is enough.

In addition, in the determination in ST612, when the base station B determines that the signature received from the mobile station 200 is not the signature assigned by the base station B, the base station B does not respond to the mobile station 200 to leave (ST615).

Upon receiving the information to the mobile station 200 from the base station B, the station 200 corrects the synchronization timing deviation based on the synchronization timing deviation information (synchronization information) (ST616). Then, the mobile station 200 transmits a handover completion message with radio resources subjected to scheduling (ST617). Upon receiving the handover completion message from the mobile station 200, the base station B sends back a response to the mobile station 200 in response to the message (ST618).

Thus, in the communication system according to Embodiment 3, since the information of signatures to use is shared among adjacent base stations and selection of signatures is adjusted, it is possible to reduce collisions that could occur with the adjacent base station in random access at the time of handover.

In addition, in the communication system according to Embodiment 3, as ST608 as shown in FIG. 6, the case is indicated that the base station A transmitting a handover request command transmits a handover notification command to the adjacent base station C. However, the base station transmitting a handover notification command is not limited to the base station A transmitting a handover request command, and may be the base station B receiving a handover request command. Also in thus modified case, it is possible to obtain the same effect as in the case described above.

Further, in the communication systems according to Embodiments 1 to 3, the case is shown that the base station 100 selects a signature, and notifies the mobile station 200 of the signature using a handover command (handover message), but the information capable of being notified by the handover command is not limited thereto, and is capable of being modified as appropriate. For example, the base station may select not only the signature but also a frequency band position of the random access channel to notify the mobile station with a handover message. In this case, it is possible to decrease the probability of collision at the time of random access by selection of a frequency band position of the random access channel, and it is thereby possible to respond to handovers concurrently arising in the higher number of mobile stations 200.

Furthermore, as well as the frequency band position of the random access channel as described above, a time position may be selected to be notified to the mobile station 200 with a handover message. In this case, it is possible to further reduce the probability of collision at the time of random access, and it is thereby possible to respond to handovers concurrently arising in the further higher number of mobile stations 200. However, when different ranges of signatures are allocated for each base station 100 i.e. signatures to use are different for each base station 100, it is not necessary to notify and adjust signatures among base stations 100, and it is only required to manage signatures within the base station 100.

(Embodiment 4)

In the communication systems according to Embodiments 1 to 3, with respect to base-station managed signatures, the case is shown that handover is set as their intended purpose. However, the intended purpose set on the base-station managed signatures is not limited thereto, and is capable of being modified as appropriate. In a communication system according to Embodiment 4, with respect to the base-station managed signatures, paging response is set as their intended purpose, as well as handover.

In addition, configurations of the base station 100 and mobile station 200 constituting the communication system according to Embodiment 4 are the same as those in Embodiment 1, and descriptions thereof are omitted. Further, signatures in the communication system according to Embodiment 4 differ from those in the communication system according to Embodiment 1 in the respect that base-station managed signatures are set for handover and paging response as their intended purposes.

Figure 7:
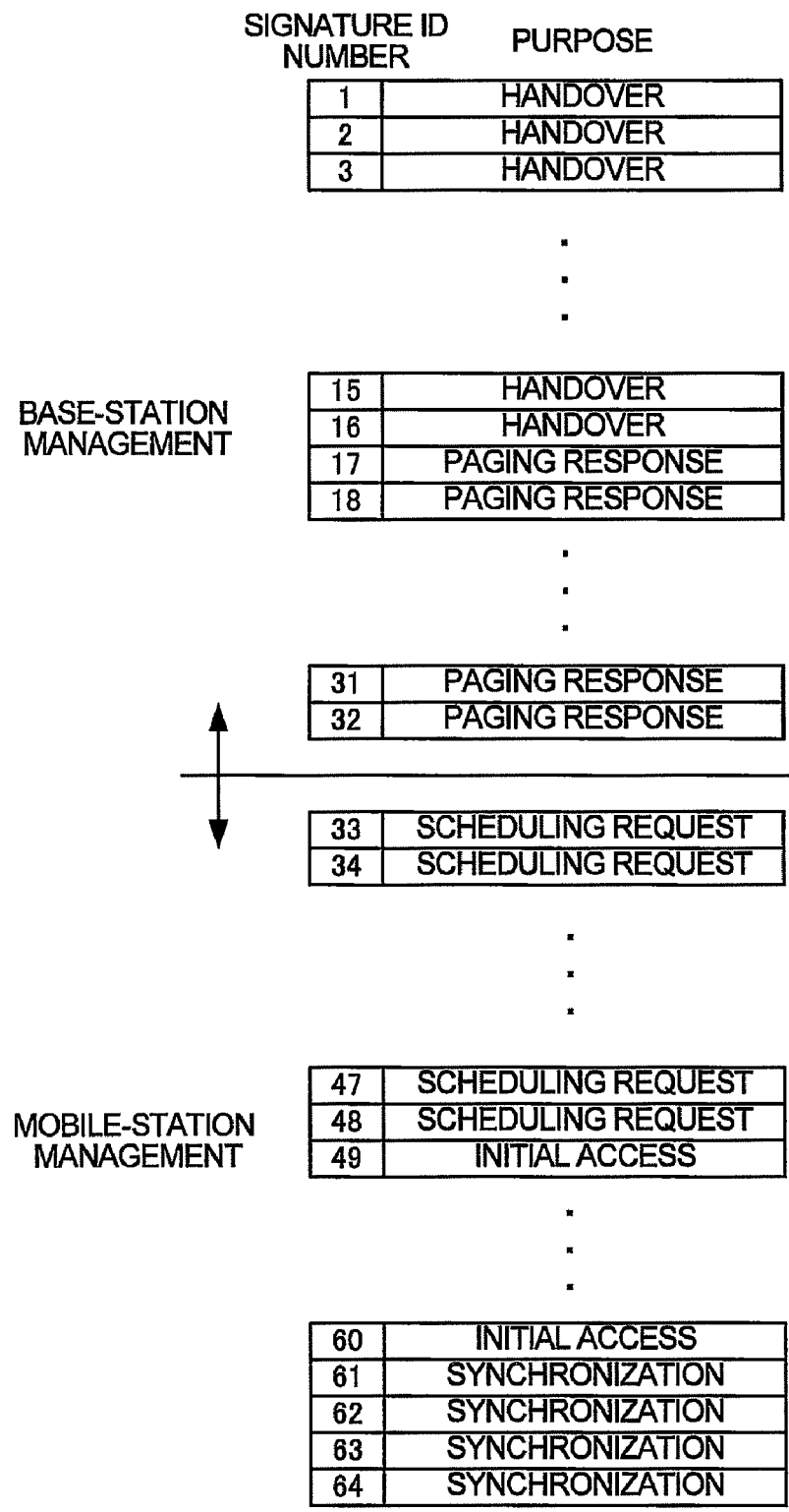
FIG. 7 is a diagram to explain a setting example of signatures in a communication system according to Embodiment 4 of the invention.

FIG. 7 is a diagram to explain a setting example of signatures in the communication system according to Embodiment 4 of the invention. In the communication system according to Embodiment 4, as shown in FIG. 7, signature numbers 1 to 32 are allocated as base-station managed signatures, and signature numbers 33 to 64 are allocated as mobile-station managed signatures. Among the base-station managed signatures, signature numbers 1 to 16 are set for handover as their intended purpose, and signature numbers 17 to 32 are set for paging response as their intended purpose.

Figure 8:
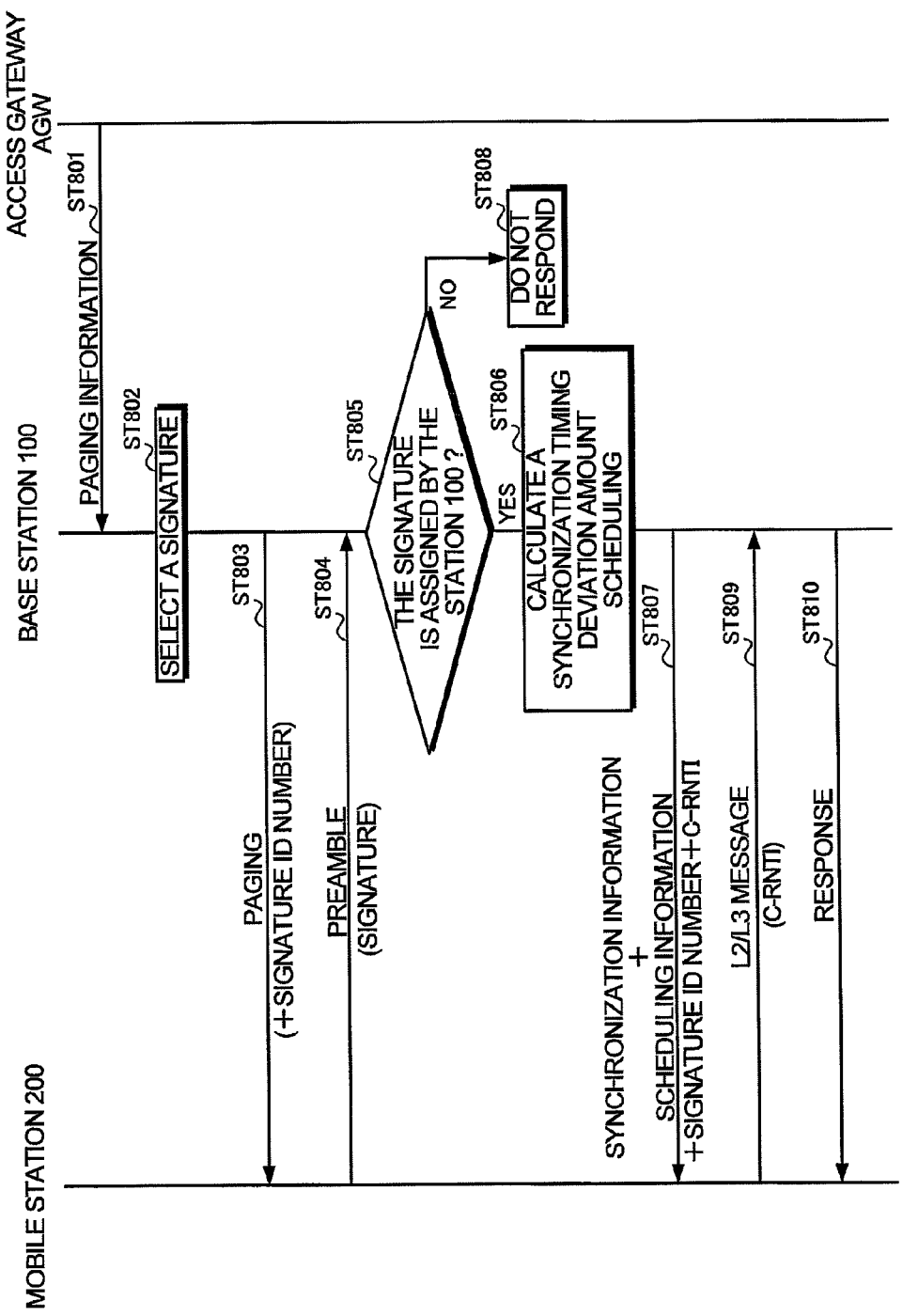
FIG. 8 is a sequence chart to explain an example of a random access procedure at the time of receiving paging in the communication system according to Embodiment 4.

Described below is an example of a random access procedure at the time of receiving paging in the communication system according to Embodiment 4. FIG. 8 is a sequence chart to explain an example of a random access procedure at the time of receiving paging in the communication system according to Embodiment 4.

As shown in FIG. 8, in the random access procedure at time of receiving paging in the communication system according to Embodiment 4, an access gateway AGW first transmits paging information to the base station 100 (ST801).

Upon receiving the paging information from the access gateway AGW, the base station 100 selects one signature from signatures for paging response among the base-station managed signatures (ST802). Herein, a signature of signature number 17 is assumed to be selected. In this case, to avoid a collision of random access, the base station 100 selects a signature from among the base-station managed signatures except signatures for paging response being used in the base station 100. Then, the base station 100 adds the selected signature number to a paging message to transmit to the mobile station 200 (ST803).

Upon receiving the paging message from the base station 100, the mobile station 200 transmits a preamble (random access preamble) including a signature of the signature number added to the paging message i.e. the signature of signature number 17 to the base station 100 on the random access channel (ST804). Upon detecting the signature from the preamble received from the mobile station 200, the base station 100 determines whether the signature is assigned by the base station 100 (ST805). Herein, since the base station 100 receives the signature of signature number 17 and this signature of signature number 17 is assigned by the base station 100, the base station 100 calculates asynchronization timing deviation amount and performs scheduling for transmitting an L2/L3 message (ST806). Further, the base station 100 selects C-RNTI, and transmits the synchronization timing deviation information (synchronization information), scheduling information, C-RNTI and the signature number to the mobile station 200 (ST807).

In addition, in the determination in ST805, when the base station 100 determines that the signature received from the mobile station 200 is not the signature assigned by the base station 100, the base station 100 does not respond to the mobile station 200 to leave (ST808).

Upon receiving the information to the mobile station 200 from the base station 100, the station 200 transmits an L2/L3 message with radio resources subjected to scheduling (ST809). Upon receiving the L2/L3 message from the mobile station 200, the base station 100 sends back a response to the mobile station 200 in response to the message (ST810).

Thus, in the communication system according to Embodiment 4, since the base-station managed signatures include signatures associated with a response at the time of receiving paging as the reason of random access, it is possible to prevent a collision from occurring in random access at the time of responding to paging. As a result, it is possible to prevent the connection time from being long due to the collision.

Particularly, in the communication system according to Embodiment 4, a signature selected by the base station 100 is included in a paging message and transmitted to the mobile station 200, and therefore, it is possible to transmit the signature selected by the base station 100 to the mobile station 200 exploiting an already-existing signal.

In addition, in the communication system according to Embodiment 4, the case is shown that the base station 100 selects a signature, and notifies the mobile station 200 of the signature using a paging message, but the information capable of being notified by the paging message is not limited thereto, and is capable of being modified as appropriate. For example, the base station may select not only the signature but also a frequency band position of the random access channel to notify the mobile station with a paging message. In this case, it is possible to decrease the probability of collision at the time of random access by selection of a frequency band position of the random access channel, and it is thereby possible to cope with paging responses concurrently arising in the higher number of mobile stations.

Further, as well as the frequency band position of the random access channel as described above, a time position may be selected to be notified to the mobile station with a paging message. In this case, it is possible to further reduce the probability of collision at the time of random access, and it is thereby possible to cope with paging responses concurrently arising in the further higher number of mobile stations.

Furthermore, in the communication system according to Embodiment 4, as shown in FIG. 7, it is described that the base-station managed signatures are divided into signatures for handover and signatures for paging response according to their intended purposes. However, in the base-station managed signatures, the base station 100 already recognizes the purpose of random access of the mobile station 200, and therefore, it is not necessary that the base-station managed signatures are always sorted according to the purposes. Particularly, in the sense of enlarging choices of the base-station managed signatures, it is preferable that the signatures are not sorted according to the purposes.

(Embodiment 5)

In the communication systems according to Embodiments 1 to 4, the case is shown that the range of base-station managed signatures and the range of mobile-station managed signatures are fixed. In contrast thereto, a communication system according to Embodiment 5 differs from the communication systems according to Embodiments 1 to 4 in the respect that respective ranges of the base-station managed signatures and mobile-station managed signatures are selectable corresponding to conditions of the base station 100.

Figure 9:
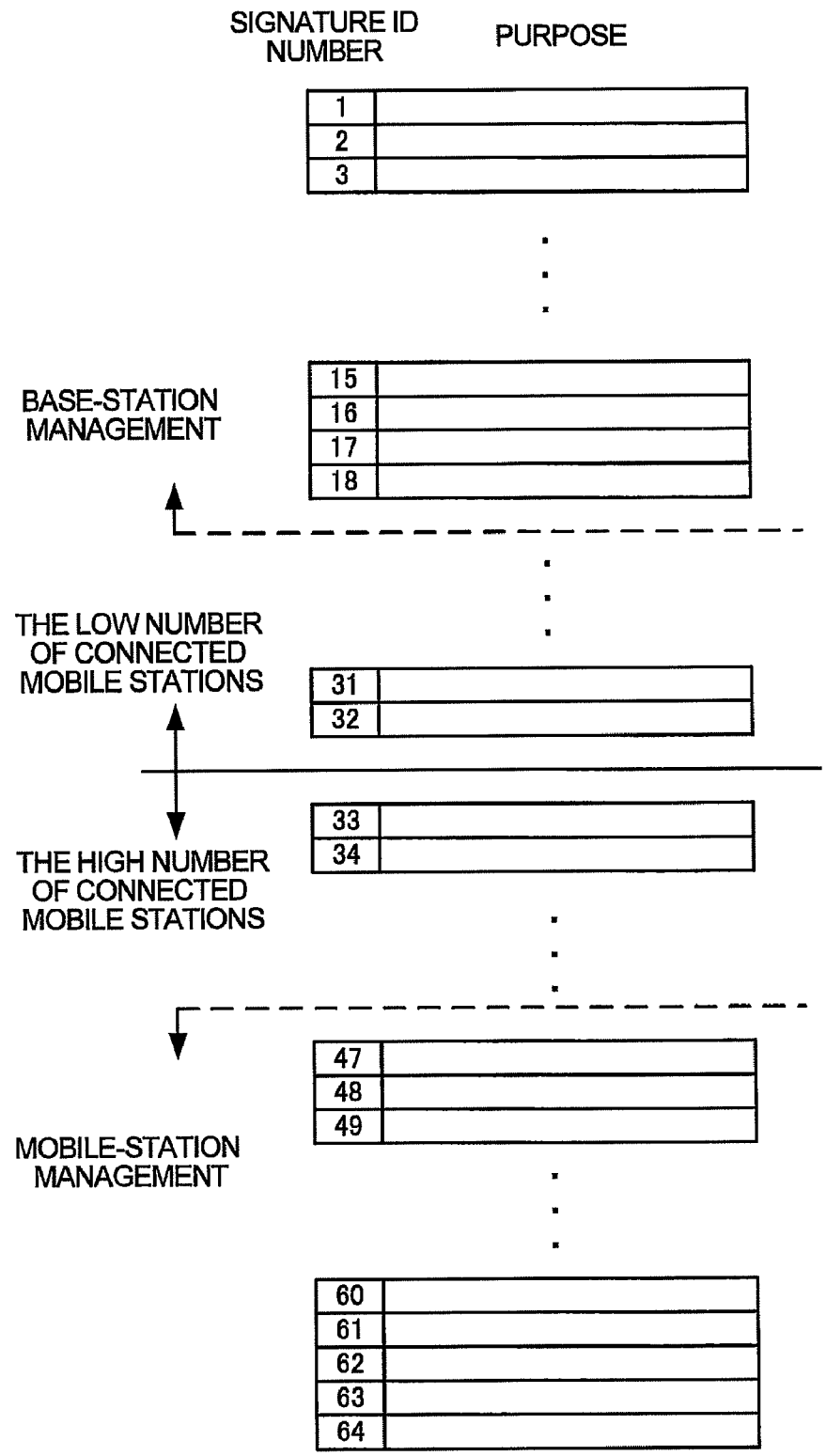
FIG. 9 is a diagram to explain the summary of setting of signatures in a communication system according to Embodiment 5 of the invention.

FIG. 9 is a diagram to explain the summary of setting of signatures in the communication system according to Embodiment 5 of the invention. In the communication system according to Embodiment 5, as shown in FIG. 9, in the case of the high number of mobile stations 200 communicating with the base station 100, since random access due to handover and the like is considered to increase, the number of base-station managed signatures is increased. Meanwhile, in the case of the low number of mobile stations 200 communicating with the base station 100, since random access due to handover and the like is considered to decrease, in order to reduce the collision from the mobile stations, the number of base-station managed signatures is decreased, while the number of mobile-station managed signatures is increased.

Figure 11:
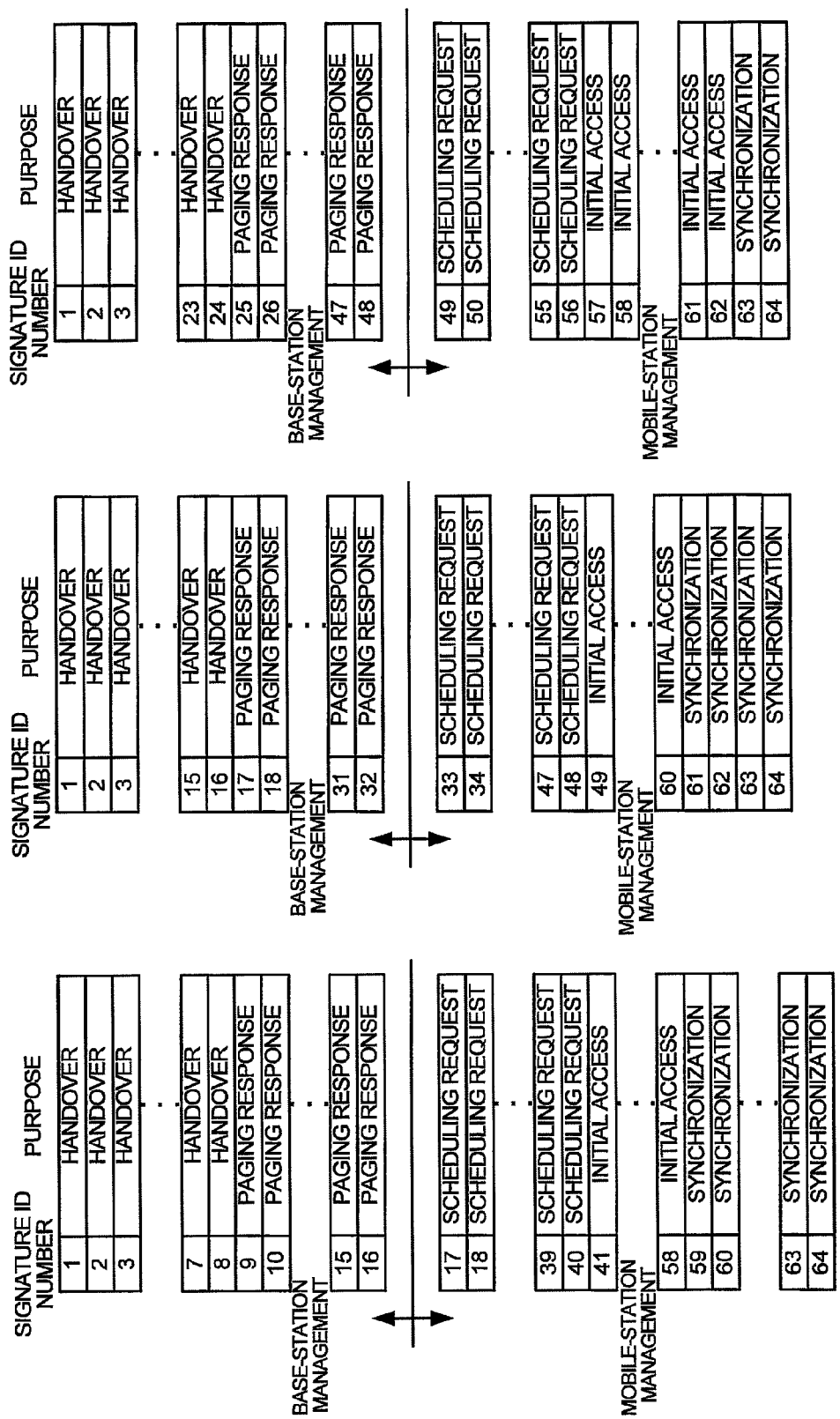
FIG. 11 is a diagram to explain a setting example of signatures in the communication system according to Embodiment 5.

A setting example of signatures in the communication system according to Embodiment 5 will specifically be described below. FIG. 10 is a diagram showing a table (hereinafter, referred to as a "number-of-signature determination table) referred to in determining the numbers of base-station managed signatures and mobile-station managed signatures in the communication system according to Embodiment 5. Further, FIG. 11 is a diagram to explain a setting example of signatures in the communication system according to Embodiment 5.

As shown in FIG. 10, in the number-of-signature determination table, the number (hereinafter, referred to as "the number of connected mobile stations") of the mobile stations 200 with which the base station 100 are communicating is associated with the signature group management number, the number of base-station managed signatures, and the number of mobile-station managed signatures. In FIG. 10, the case is shown that thresholds of the number of connected mobile stations are A, B, C and D (assuming A<B<C<D) and thus four. In the base station 100, in response to the number of connected mobile stations, the signature group management number is determined, thereby varying the number of base-station managed signatures and the number of mobile-station managed signatures. In addition, common signatures are used between the base station 100 and mobile stations 200.

FIG. 11(a) shows a setting example of signatures when the number of connected mobile stations is less than or equal to the lowest threshold A. In FIG. 11(a), the case is shown where signature group management number 1 is selected and the number of mobile-station managed signatures is higher than the number of base-station managed signatures. FIG. 11(b) shows a setting example of signatures when the number of connected mobile stations is between threshold B and threshold C. In FIG. 11(b), the case is shown where signature group management number 3 is selected and the number of mobile-station managed signatures is equal to the number of base-station managed signatures. FIG. 11(c) shows a setting example of signatures when the number of connected mobile stations is more than or equal to the highest threshold D. In FIG. 11(c), the case is shown where signature group management number 5 is selected and the number of mobile-station managed signatures is lower than the number of base-station managed signatures.

The base station 100 selects a signature from the signature group management number thus selected corresponding to the number of connected mobile stations. Then, the base station 100 notifies the mobile station 200 of the signature group management number through the broadcast information. The mobile station 200 selects a signature group corresponding to the signature group management number as in the base station 100, and selects a signature from the selected signature group. Thus, since the signature group management number is included in the broadcast information, it is possible to notify the mobile station 100 of the signature group management number exploiting an already-existing signal.

In addition, shown herein is the case that the numbers of base-station managed signatures and mobile-station managed signatures are varied corresponding to the number of connected mobile stations. However, the criterion in varying the numbers of base-station managed signatures and mobile-station managed signatures is not limited thereto, and is capable of being modified as appropriate. For example, the usage rate of the user data channel on downlink or uplink and the like may be used as the criterion. Further, considering conditions of adjacent base stations 100 is preferable as the Embodiment.

Figure 12:
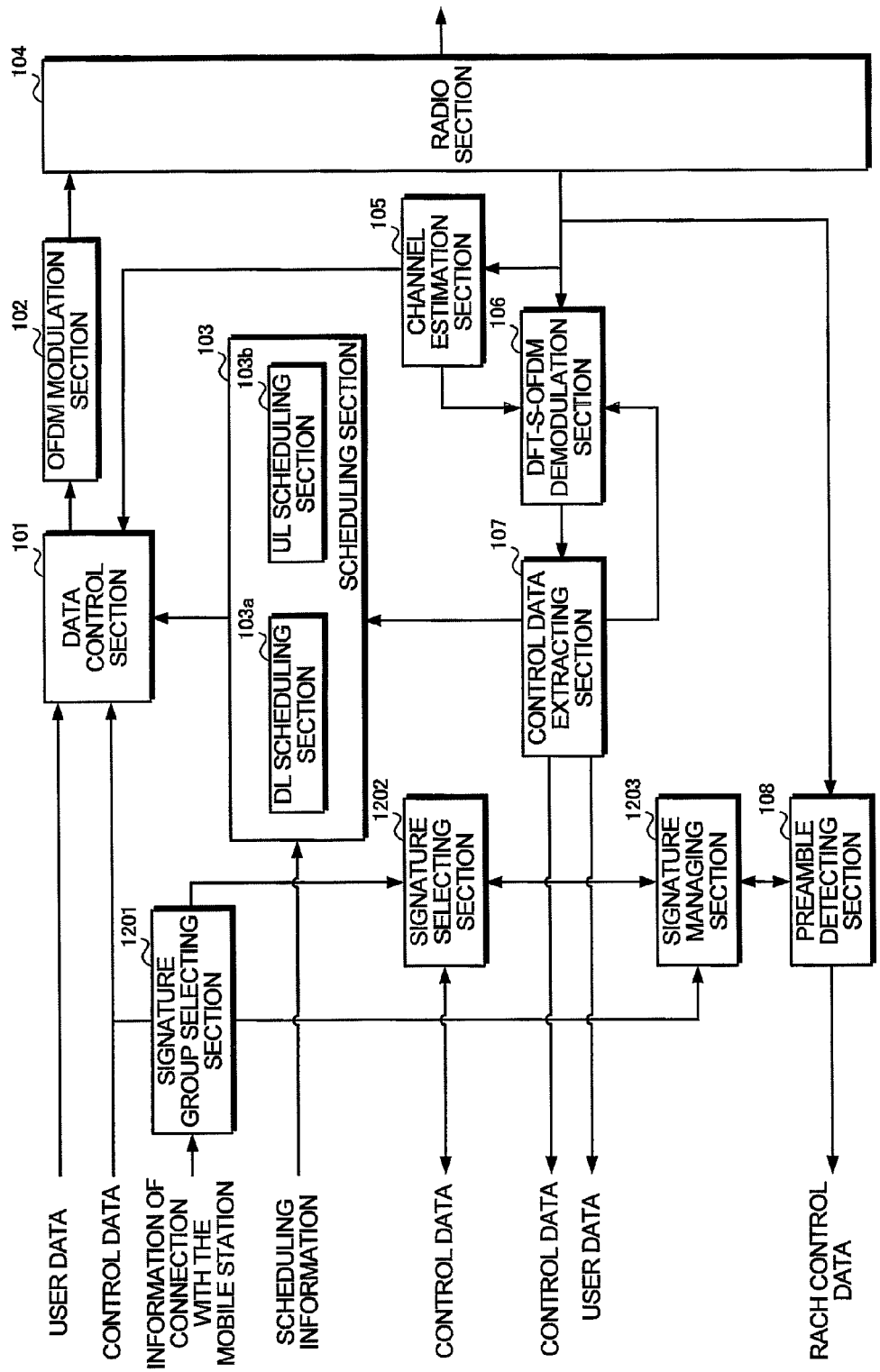
FIG. 12 is a block diagram showing an example of a configuration of a base station included in the communication system according to Embodiment 5.
Figure 13:
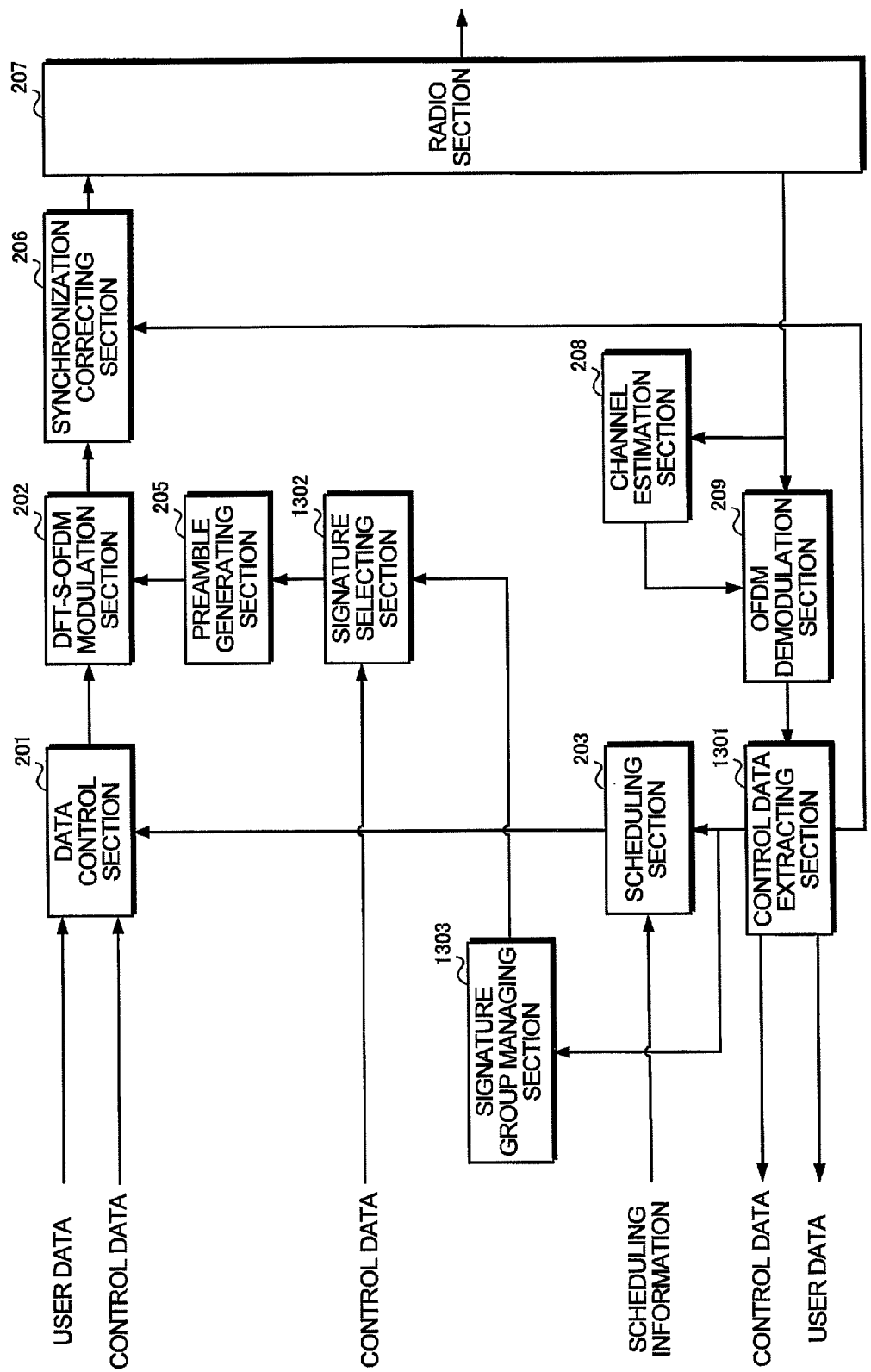
FIG. 13 is a block diagram showing an example of a configuration of a mobile station included in the communication system according to Embodiment 5.
Figure 14:
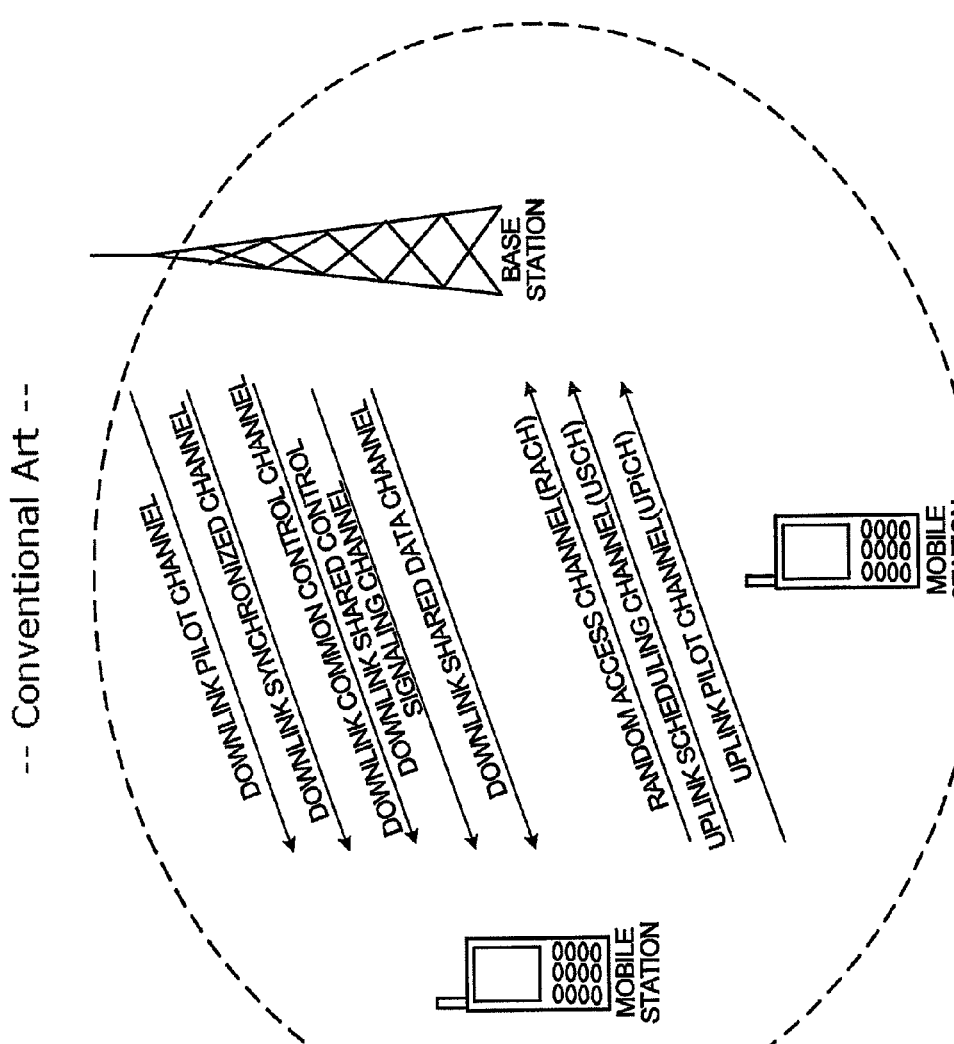
FIG. 14 is a diagram to explain a configuration of uplink in EUTRA.
Figure 15:
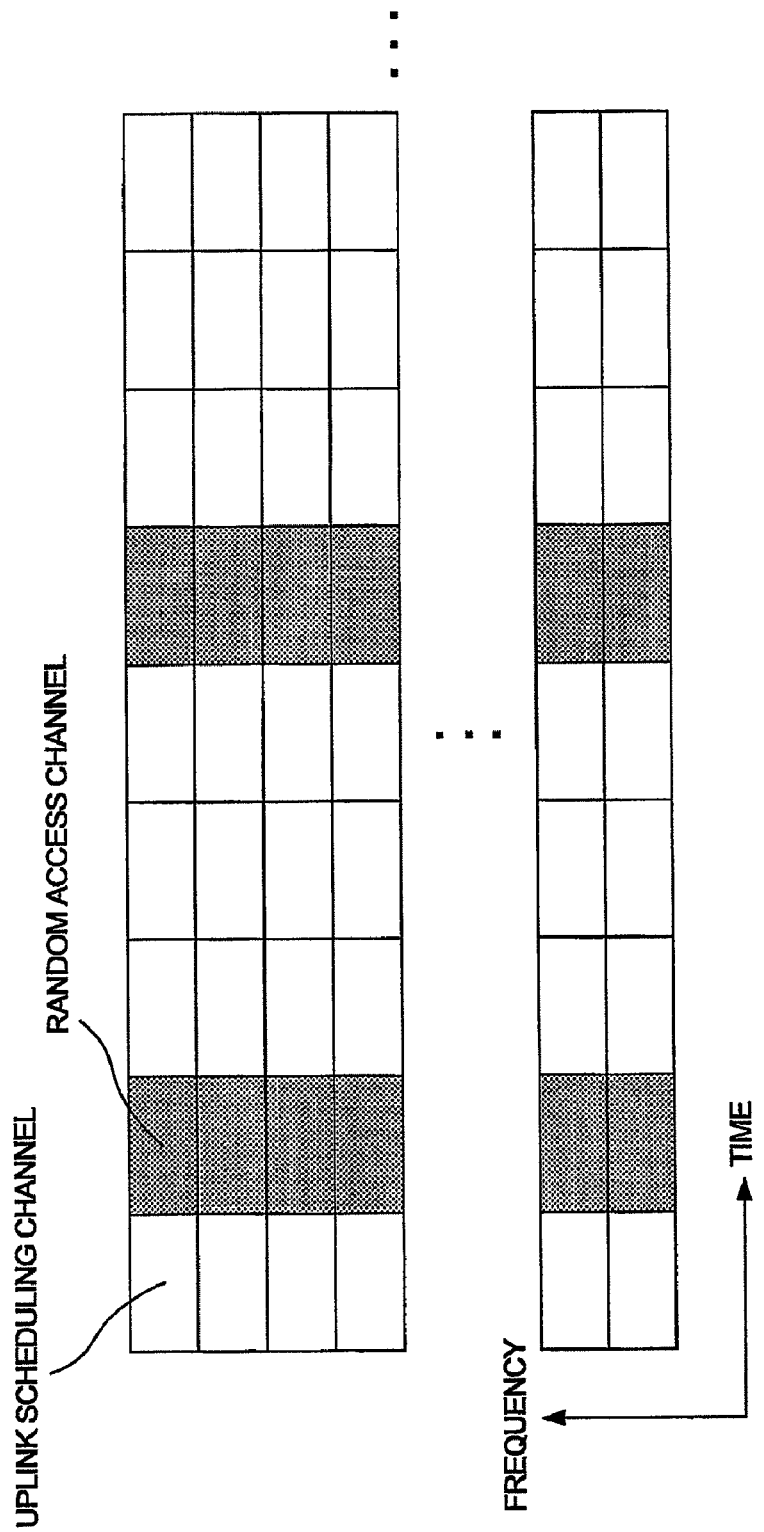
FIG. 15 is a diagram to explain an uplink random access channel in E-UTRA.
Figure 18:
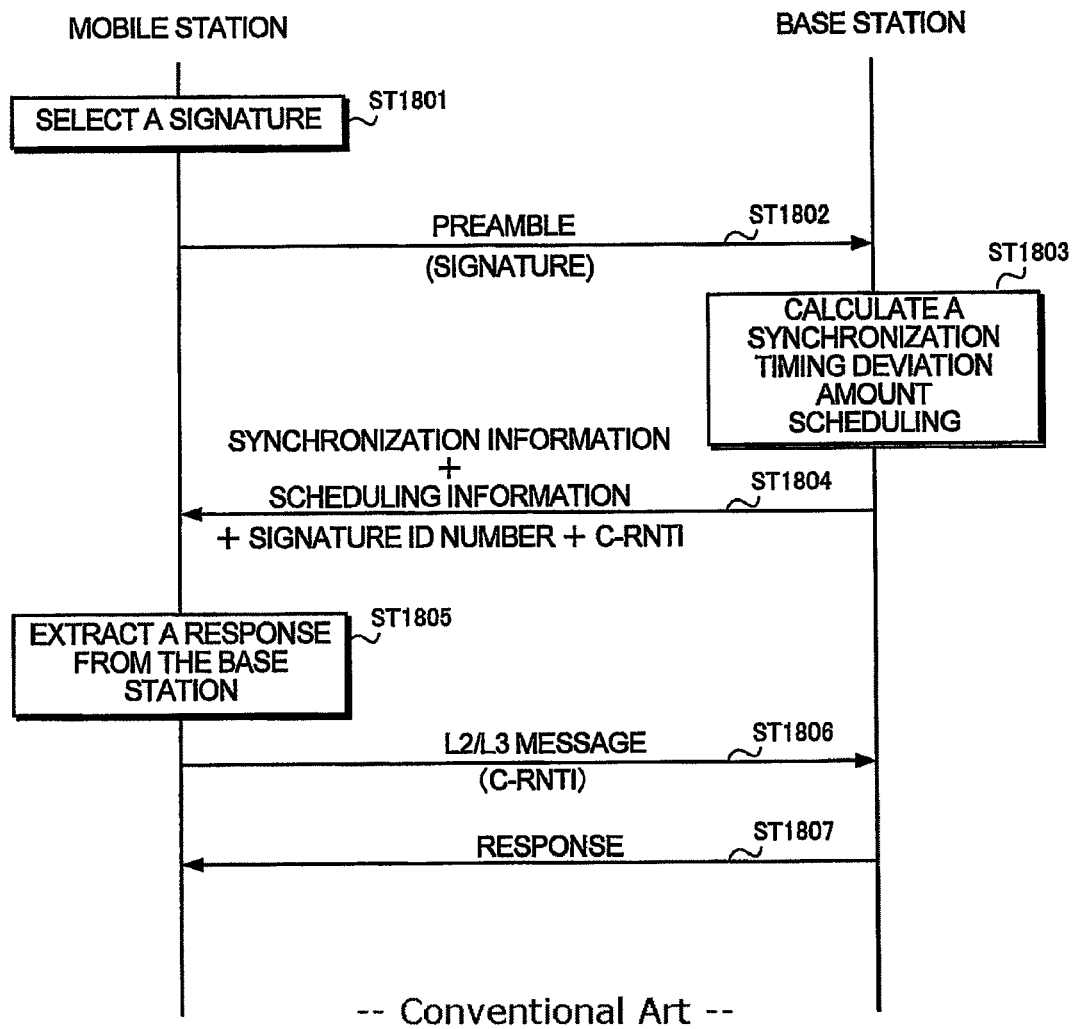
FIG. 18 is a sequence chart to explain an example of a conventional procedure of random access.

Described herein is an example of configurations of the base station 100 and mobile station 200 included in the communication system according to Embodiment 5. FIG. 12 is a block diagram showing an example of the configuration of the base station included in the communication system according to Embodiment 5. FIG. 13 is a block diagram showing an example of the configuration of the mobile station included in the communication system according to Embodiment 5. In addition, in FIGS. 12 and 13, the same structural elements as in FIGS. 2 and 3 are assigned the same reference numerals, and descriptions thereof are omitted.

The base station 100 included in the communication system according Embodiment 5 differs from the base station 100 according to Embodiment 1 in respects that a signature group selecting section 1201 is provided, and that a signature selecting section 1202 and signature managing section 1203 have different functions. Described below are the signature group selecting section 1201, signature selecting section 1202 and signature managing section 1203.

The signature group selecting section 1201 selects the base-station managed signature group and mobile-station managed signature group based on information of connection with the mobile station 200 from the higher layer, and notifies the selection result to the signature selecting section 1202 and signature managing section 1203. Further, to notify the mobile station 200 of the information of the selected signature groups through broadcast information, the signature group selecting section 1201 outputs the selected signature group management number to the data control section 101. The signature selecting section selects a signature from the base-station managed signature group notified from the signature group selecting section to notify the higher layer.

By directions from the higher layer, the signature selecting section 1202 selects a signature from the base-station managed signature group notified from the signature group selecting section 1201 to notify the higher layer and signature group managing section 1203. In selecting a signature, the signature selecting section 1202 checks with the signature managing section 1203 for signature numbers being used, and selects one from among signatures except the signatures being used.

The signature managing section 1203 stores a signature number selected in the signature selecting section 1202, and deletes the base-station managed signature detected in the preamble detecting section 108 from stored signatures.

Meanwhile, the mobile station 200 included in the communication system according to Embodiment 5 differs from the mobile station 200 according to Embodiment 1 in respects that a control data extracting section 1301 and signature selecting section 1302 have different functions, and that a signature group managing section 1303 is provided. Described below are the control data extracting section 1301, signature selecting section 1302 and signature group managing section 1303.

The control data extracting section 1301 divides reception data into user data and control data. In the divided control data, scheduling information is output to the scheduling section 203, uplink synchronization information is output to the synchronization correcting section 206, the signature group management number is output to the signature group managing section 1303, and the other control data and user data is output to the higher layer. The signature group managing section 1303 constructs a signature group from the signature group management number received from the control data extracting section 1301, and outputs the resultant to the signature selecting section 1302.

The signature selecting section 1302 selects a signature number to use in random access by directions from the higher layer. As directions from the higher layer, the purpose of random access is notified. When the notified purpose is a base-station managed purpose such as handover, paging or the like, the signature selecting section 1302 selects a signature number instructed from the higher layer. When the notified purpose is a mobile-station managed purpose, the signature selecting section 1302 randomly selects a signature number from signatures sorted according to the purpose among mobile-station managed signatures of the signature group output from the signature group managing section 1303, corresponding to the purpose. The signature selecting section 1302 outputs the selected signature number to the preamble generating section 205.

Thus, in the communication system according to Embodiment 5, since respective ranges of the base-station managed signatures and mobile-station managed signatures are selectable corresponding to conditions of the base station 100, it is possible to select the optimal numbers of base-station managed signatures and mobile-station managed signatures corresponding to conditions of the base station 100, and to efficiently prevent the collision within the base station 100 due to random access.

The present invention is not limited to the above-mentioned Embodiments, and is capable of being carried into practice with various modifications thereof. In the above-mentioned Embodiments, sizes, shapes and the like as shown in the accompanying drawings are not limited thereto, and are capable of being modified as appropriate within the scope of exhibiting the effects of the invention. Moreover, the invention is capable of being carried into practice with modifications thereof as appropriate without departing from the scope of the object of the invention.

For example, in the above-mentioned Embodiments, as examples of the reason of random access associated with base-station managed signatures, handover and response at the time of receiving paging are shown, but the invention is not limited thereto, and is capable of being modified as appropriate. For example, reasons such as synchronization maintenance and the like may be associated as the reason of random access. In this case, it is possible to maintain synchronization under the imitative of the base station 100.

The invention claimed is:

1. A processing method in a base station, comprising:
    when a mobile station performs random access using a single signature from among first and second signature groups comprised of a predetermined constant-total number of signatures, notifying the mobile station with a single value indicating either the actual number of signatures included in the second signature group or an index corresponding to one of a plurality of predetermined numbers of signatures included in the second signature group so that the mobile station may specify the signatures of the second signature group,
    wherein the first signature group is comprised of signatures that no mobile station can select, and the second signature group is comprised of signatures that can be selected by every mobile station, and
    signature ID numbers which respectively specify the signatures included in the first signature group, and signature ID numbers which respectively specify the signatures included in the second signature group, are arranged according to a predetermined rule.

2. The processing method according to claim 1, wherein the base station includes the single value in broadcast information, and notifies the mobile station of the single value.

3. The processing method according to claim 1, further comprising:
    detecting random access that the mobile station performs using a signature selected by the mobile station from the second signature group.

4. The processing method according to claim 2, further comprising:
    detecting random access that the mobile station performs using a signature selected by the mobile station from the second signature group.

5. The processing method according to claim 1, further comprising:
    selecting a signature from the first signature group,
    notifying the mobile station of information representing the signature selected by the base station from the first signature group, and
    detecting random access that the mobile station performs using the signature selected from the first signature group.

6. The processing method according to claim 2, further comprising:
    selecting a signature from the first signature group,
    notifying the mobile station of information representing the signature selected by the base station from the first signature group, and
    detecting random access that the mobile station performs using the signature selected from the first signature group.

7. The processing method according to claim 3, further comprising:
    selecting a signature from the first signature group,
    notifying the mobile station of information representing the signature selected by the base station from the first signature group, and
    detecting random access that the mobile station performs using the signature selected from the first signature group.

8. The processing method according to claim 4, further comprising:
    selecting a signature from the first signature group,
    notifying the mobile station of information representing the signature selected by the base station from the first signature group, and
    detecting random access that the mobile station performs using the signature selected from the first signature group.

9. A processing method in a mobile station, comprising:
    in performing random access to a base station using a single signature from among first and second signature groups comprised of a predetermined constant-total number of signatures, acquiring from the base station a single value indicating either the actual number of signatures included in the second signature group or an index corresponding to one of a plurality of predetermined numbers of signatures included in the second signature group; and
    specifying the signatures included in the second signature group,
    wherein the first signature group is comprised of signatures that no mobile station can select, and the second signature group is comprised of signatures that can be selected by every mobile station, and
    signature ID numbers which respectively specify the signatures included in the first signature group, and signature ID numbers which respectively specify the signatures included in the second signature group, are arranged according to a predetermined rule.

10. The processing method according to claim 9, wherein the mobile station acquires from broadcast information the single value.

11. The processing method according to claim 9, further comprising:
    performing random access to the base station using a signature selected by the mobile station from the second signature group.

12. The processing method according to claim 10, further comprising:
    performing random access to the base station using a signature selected by the mobile station from the second signature group.

13. The processing method according to claim 9, wherein, when the mobile station acquires from the base station information representing a signature that is selected by the base station from the first signature group, the mobile station performs random access to the base station using the signature selected by the base station.

14. The processing method according to claim 10, wherein when the mobile station acquires from the base station information representing a signature that is selected by the base station from the first signature group , the mobile station performs random access to the base station using the signature selected by the base station.

15. The processing method according to claim 11, wherein when the mobile station acquires from the base station information representing a signature that is selected by the base station from the first signature group, the mobile station performs random access to the base station using the signature selected by the base station.

16. The processing method according to claim 12, wherein when the mobile station acquires from the base station information representing a signature that is selected by the base station from the first signature group, the mobile station performs random access to the base station using the signature selected by the base station.

17. A communication system: comprising:
 at least one mobile station having stored therein first and second signature groups together comprising a predetermined constant-total number of signatures; and
 a base station having stored therein the first and second signature groups, wherein
 the at least one mobile station performs random access to the base station using a single signature from among the first and second signature groups,
 the first signature group is comprised of signatures that no mobile station can select, and the second signature group is comprised of signatures that can be selected by every mobile station,
 signature ID numbers which respectively specify the signatures included in the first signature group, and signature ID numbers which respectively specify the signatures included in the second signature group, are arranged according to a predetermined rule,
 the base station notifies the mobile station of a single value indicating either the actual number of signatures included in the second signature group or an index corresponding to one of a plurality of predetermined numbers of signatures included in the second signature group, and
 the mobile station acquires from the base station the single value, and specifies the signatures included in the second signature group.

18. The communication system according to claim 17, wherein the base station includes the single value in broadcast information, and notifies the mobile station of the single value, and
 the at least one mobile station acquires the single value from the broadcast information.

19. The communication system according to claim 17, wherein the at least one mobile station performs random access to the base station using a signature selected by the mobile station from the second signature group after acquiring the single value, and
 the base station detects the random access that the mobile station performs using the signature selected by the mobile station from the second signature group.

20. The communication system according to claim 18, wherein the at least one mobile station performs random access to the base station using a signature selected by the mobile station from the second signature group after acquiring the single value, and
 the base station detects the random access that the mobile station performs using the signature selected by the mobile station from the second signature group.

21. The communication system according to claim 17, wherein the base station selects a signature from the first signature group, and notifies the mobile station of information representing the signature selected by the base station from the first signature group,
 the mobile station acquires from the base station the information representing the signature selected from the first signature group, and performs random access to the base station using the signature selected from the first signature group, and
 the base station detects the random access that the mobile station performs using the signature selected from the first signature group.

22. The communication system according to claim 18, wherein the base station selects a signature from the first signature group, and notifies the mobile station of information representing the signature selected by the base station from the first signature group,
 the mobile station acquires from the base station the information representing the signature selected from the first signature group, and performs random access to the base station using the signature selected from the first signature group, and
 the base station detects the random access that the mobile station performs using the signature selected from the first signature group.

23. The communication system according to claim 19, wherein the base station selects a signature from the first signature group, and notifies the mobile station of information representing the signature selected by the base station from the first signature group,
 the mobile station acquires from the base station the information representing the signature selected form the first signature group, and performs random access to the base station using the signature selected from the first signature group, and
 the base station detects the random access that the mobile station performs using the signature selected from the first signature group.

24. The communication system according to claim 20, wherein the base station selects a signature from the first signature group, and notifies the mobile station of information representing the signature selected by the base station from the first signature group,
 the mobile station acquires from the base station the information representing the signature selected from the first signature group, and performs random access to the base station using the signature selected from the first signature group, and
 the base station detects the random access that the mobile station performs using the signature selected from the first signature group.

25. A base station comprising circuitry configured to perform processing when a mobile station performs random access using a single signature from among first and second signature groups comprised of a predetermined constant-total number of signatures, wherein:
 the first signature group comprised of signatures that no mobile station can select; the second signature group comprised of signatures that can be selected by every mobile station;
 signature ID numbers which respectively specify the signatures included in the first signature group; and
 signature ID numbers which respectfully specify the signatures included in the second signature group, wherein
  the signature ID numbers specifying the signatures included in the first and second signature groups are arranged according to a predetermined rule, and
  the base station notifies the mobile station with a single value indicating either the actual number of signatures included in the second signature group or an index corresponding to one of a plurality of predetermined numbers of signatures included in the second signature group so that the mobile station may specify the signatures included in the second signature group.

26. The base station according to claim 25, wherein the base station includes the single value in broadcast information, and notifies the mobile station of the single value.

27. The base station according to claim 25, wherein the base station detects random access that the mobile station performs using a signature selected by the mobile station from the second signature group.

28. The base station according to claim 26, wherein the base station detects random access that the mobile station performs using a signature selected by the mobile station from the second signature group.

29. The base station according to claim 25, wherein when the base station selects a signature from the first signature group, the base station notifies the mobile station of information representing the signature selected from the first signature group, and detects random access that the mobile station performs using the signature selected from the first signature group.

30. The base station according to claim 26, wherein when the base station selects a signature from the first signature group, the base station notifies the mobile station of information representing the signature selected from the first signature group, and detects random access that the mobile station performs using the signature selected from the first signature group.

31. The base station according to claim 27, wherein when the base station selects a signature from the first signature group, the base station notifies the mobile station of information representing the signature selected from the first signature group, and detects random access that the mobile station performs using the signature selected from the first signature group.

32. The base station according to claim 28, wherein when the base station selects a signature from the first signature group, the base station notifies the mobile station of information representing the signature selected from the first signature group, and detects random access that the mobile station performs using the signature selected from the first signature group.

33. A mobile station comprising circuitry configured to perform random access to a base station using a single signature from among first and second signature groups comprised of a predetermined constant-total number of signatures, wherein:
the first signature group comprised of signatures that no mobile station can select;
the second signature group comprised of signatures that can be selected by every mobile station,
signature ID numbers which respectively specify the signatures included in the first signature group; and
signature ID numbers which respectively specify the signatures included in the second signature group, wherein
the signature ID numbers specifying the signatures included in the first and second signature groups are arranged according to a predetermined rule, and
the mobile station acquires from the base station a single value indicating either representing the actual number of signatures included in the second signature group or an index corresponding to one of a plurality of predetermined numbers of signatures included in the second signature group, and specifies the signatures included in the second signature group.

34. The mobile station according to claim 33, wherein the mobile station acquires the single value from broadcast information.

35. The mobile station according to claim 33, wherein the mobile station performs random access to the base station using a signature selected by the mobile station from the second signature group.

36. The mobile station according to claim 34, wherein the mobile station performs random access to the base station using a signature selected by the mobile station from the second signature group.

37. The mobile station according to claim 33, wherein, when the mobile station acquires from the base station information representing a signature that is selected by the base station from the first signature group, the mobile station performs random access to the base station using the signature selected by the base station.

38. The mobile station according to claim 34, wherein, when the mobile station acquires from the base station information representing a signature that is selected by the base station from the first signature group, the mobile station performs random access to the base station using the signature selected by the base station.

39. The mobile station according to claim 35, wherein when the mobile station acquires from the base station information representing a signature that is selected by the base station from the first signature group, the mobile station performs random access to the base station using the signature selected by the base station.

40. The mobile station according to claim 36, wherein when the mobile station acquires from the base station information representing a signature that is selected by the base station from the first signature group, the mobile station performs random access to the base station using the signature selected by the base station.

* * * * *